United States Patent
Klein Gunnewiek et al.

(10) Patent No.: US 8,345,751 B2
(45) Date of Patent: Jan. 1, 2013

(54) METHOD AND SYSTEM FOR ENCODING A 3D VIDEO SIGNAL, ENCLOSED 3D VIDEO SIGNAL, METHOD AND SYSTEM FOR DECODER FOR A 3D VIDEO SIGNAL

(75) Inventors: Reinier Bernardus Maria Klein Gunnewiek, Eindhoven (NL); Christiaan Varekamp, Eindhoven (NL); Wilhelmus Hendrikus Alfonsus Bruls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 343 days.

(21) Appl. No.: 12/665,093

(22) PCT Filed: Jun. 19, 2008

(86) PCT No.: PCT/IB2008/052425
§ 371 (c)(1),
(2), (4) Date: Dec. 17, 2009

(87) PCT Pub. No.: WO2009/001255
PCT Pub. Date: Dec. 31, 2008

(65) Prior Publication Data
US 2010/0195716 A1    Aug. 5, 2010

(30) Foreign Application Priority Data
Jun. 26, 2007  (EP) .................................... 07111074

(51) Int. Cl.
H04N 11/04    (2006.01)
(52) U.S. Cl. ................. 375/240.08; 375/240.01; 348/51

(58) Field of Classification Search ............. 375/240.08, 375/240.01; 348/51
See application file for complete search history.

(56) References Cited

U.S. PATENT DOCUMENTS

| | | | |
|---|---|---|---|
| 5,706,417 A | 1/1998 | Adelson | |
| 5,969,850 A | 10/1999 | Harrold et al. | |
| 6,215,899 B1 | 4/2001 | Morimura et al. | |
| 6,320,978 B1 * | 11/2001 | Szeliski et al. | 382/154 |
| 6,348,918 B1 * | 2/2002 | Szeliski et al. | 345/419 |
| 6,487,304 B1 * | 11/2002 | Szeliski | 382/107 |
| 7,573,475 B2 * | 8/2009 | Sullivan et al. | 345/427 |

(Continued)

FOREIGN PATENT DOCUMENTS
WO    9629678 A1    9/1996

OTHER PUBLICATIONS

Popescu et al: "The Depth Discontinuity Occlusion Camera"; Proceedings of ACM Symposium on Interactive 3D Graphics (I3D), 139-143, 2006.*

(Continued)

*Primary Examiner* — Christopher S Kelley
*Assistant Examiner* — Jonathan Torchman

(57) ABSTRACT

In a method for encoding and an encoder for a 3D video signal, center view frames, a depth map for center view frames and an occlusion data frame are encoded. On the basis of the depth map for the center view frame a distinction is made between functional and non-functional data in an occlusion data frame. This allows a strong reduction in bits needed for the encoded occlusion data frame. In the decoder a combined data stream is made of functional data in the encoded occlusion data frames and the center view frames. Preferably the center view frames are used as reference frames in encoding the occlusion data frames.

46 Claims, 15 Drawing Sheets

U.S. PATENT DOCUMENTS

| | | | |
|---|---|---|---|
| 7,596,243 B2* | 9/2009 | Paniconi et al. | 382/107 |
| 2006/0045187 A1* | 3/2006 | Auberger et al. | 375/240.25 |
| 2006/0210146 A1* | 9/2006 | Gu | 382/154 |
| 2007/0024614 A1* | 2/2007 | Tam et al. | 345/419 |

OTHER PUBLICATIONS

Grammalikis et al: "Disparity and Occlusion Estimation in Multiocular Systems and Their Coding for the Communication of Multiview Image Sequences"; IEEE Transactions on Circuits and Systems for Video Technology, vol. 8, No. 3, Jun. 1998, pp. 328-344.

Aydinoglu et al: "Region-Based Stereo Image Coding"; Proceedings of the International Conference on Image Processing (ICIP), Washington, Oct. 23-26, 1995, and Proceedings of the International Conference on Image Processing (ICIP), Los Alamitos, IEEE Computer Society Press, Oct. 23, 1995, vol. 2, pp. 57-60.

Shade et al: "Layered Depth Images"; Computer Graphics Proceedings, Annual Conference Series, Orlando, FL, Jul. 19-24, 1998, SIGGRAPH 98, pp. 231-242.

* cited by examiner

METHOD AND SYSTEM FOR ENCODING A 3D VIDEO SIGNAL, ENCLOSED 3D VIDEO SIGNAL, METHOD AND SYSTEM FOR DECODER FOR A 3D VIDEO SIGNAL

FIELD OF THE INVENTION

The invention relates to the field of video encoding and decoding. It presents a method and system for encoding a 3D video signal. The invention also relates to a method and system for decoding a 3D video signal. The invention also relates to an encoded 3D video signal.

BACKGROUND OF THE INVENTION

Recently there has been much interest in providing 3-D images on 3-D image displays. It is believed that 3-D imaging will be, after color imaging, the next great innovation in imaging. We are now at the advent of introduction of auto-stereoscopic displays for the consumer market.

A 3-D display device usually has a display screen on which the images are displayed.

Basically, a three dimensional impression can be created by using stereo pairs, i.e. two slightly different images directed at the two eyes of the viewer.

There are several ways to produce stereo images. The images may be time multiplexed on a 2D display, but this requires that the viewers wear glasses with e.g. LCD shutters. When the stereo images are displayed at the same time, the images can be directed to the appropriate eye by using a head mounted display, or by using polarized glasses (the images are then produced with orthogonally polarized light). The glasses worn by the observer effectively route the views to each eye. Shutters or polarizer's in the glasses are synchronized to the frame rate to control the routing. To prevent flicker, the frame rate must be doubled or the resolution halved with respect to the two dimensional equivalent image. A disadvantage of such a system is that glasses have to be worn to produce any effect. This is unpleasant for those observers who are not familiar with wearing glasses and a potential problem for those already wearing glasses, since the additional pair of glasses does not always fit.

Instead of near the viewer's eyes, the two stereo images can also be split at the display screen by means of a splitting screen such as a parallax barrier, as e.g. shown in U.S. Pat. No. 5,969,850. Such a device is called an auto-stereoscopic display since it provides itself (auto-) a stereoscopic effect without the use of glasses. Several different types of auto-stereoscopic devices are known.

Whatever type of display is used, the 3-D image information has to be provided to the display device. This is usually done in the form of a video signal comprising digital data.

Because of the massive amounts of data inherent in digital imaging, the processing and/or the transmission of digital image signals form significant problems. In many circumstances the available processing power and/or transmission capacity is insufficient to process and/or transmit high quality video signals. More particularly, each digital image frame is a still image formed from an array of pixels.

The amounts of raw digital information are usually massive requiring large processing power and/or or large transmission rates which are not always available. Various compression methods have been proposed to reduce the amount of data to be transmitted, including for instance MPEG-2, MPEG-4 and H.263.

These compression methods have originally been set up for standard 2D images.

The generation of 3-D images is conventionally done by converting an incoming encoded 2D-video signal into a 3-D video signal at the display side. The incoming 2D data sequences are converted into 3D sequences just before displaying the video sequence. Often at the display side to the pixels in the 2-D image a depth map is added, said depth map providing information on the depth of the pixel within the image and thus providing 3D information. Using the depth map for an image a left and right image can be constructed providing a 3D image. Relative depth of objects within a 2D-image may, for instance, be deduced from the focus (in-focus, out-of-focus) or how objects obscure each other.

Since 3-D information generated at the display side will have imperfections, there is a need for generating improved 3D information. 3D information that is generated at the acquisition side can provide improved 3D image rendering due to
  the possibility of more powerful computing at the acquisition side
  the possibility of off line processing
  the possibility of manual intervention If 3D information is generated at the acquisition side, this information needs to be transmitted and in order to have a low extra overhead in terms of bit rate, compression of 3D information is required. Preferably the compression (or encoding) of the 3D information is performed in such a manner that compression of 3D information can be implemented using existing compression standards with only relatively small adjustments.

Often 3D information is given in the form of an image with a depth map (z-map).

Better depth maps will enable 3D displays to produce more depth. Increase in depth reproduction will, however, result in visible imperfections around depth discontinuities. These visible imperfections undermine greatly the positive effects of improved depth maps. Furthermore the transmission capacities are limited and coding efficiency is very important.

It is thus an object of the invention to provide a method for encoding 3D image data at the transmission side wherein visible imperfections around depth discontinuities for a displayed image are reduced while keeping the amount of data within the encoded data in bounds. Preferably the coding efficiency is large. Also, preferably, the method is compatible with existing encoding standards.

It is a further object to provide an improved encoder for encoding a 3D video signal, a decoder for decoding a 3D video signal and a 3D video signal.

SUMMARY OF THE INVENTION

To this end the method for coding in accordance with the invention is characterized in that a 3D video signal is encoded, the encoded 3D video signal comprising a centre view video frame, a depth map for the centre view video frame and an occlusion data frame for the center view video frame, wherein under control of data in the depth map for the centre view, for the occlusion data frame data an indication means is generated for distinguishing functional data in the occlusion data frame from nonfunctional data, where after the occlusion data frame is encoded.

In practice this means that in the occlusion data frame there are areas for which no relevant occlusion (i.e. non functional) data are generated. The method encompasses a "switching function" wherein the switch has at least two settings, one setting in which the data is recognized as being non-functional, i.e. independent of the actual video content and/or irrelevant, and one setting in which functional data, i.e. data dependent on the video content and relevant. Being able to distinguish the non-functional data from functional data allows increasing the coding efficiency of the following encoding and/or decrease the numbers of bits transmitted.

In preferred embodiments the occlusion data frame is encoded after the depth map is encoded. In principle the original depth map may be used. However, a reverse process will be used at the decoder side and at the decoder side the "original" is no longer available, only an encoded version. Using the original at the encoder side, instead of an encoded/decoded leads to an uncertainty since the process at the decoder side would not be exactly the same.

In an embodiment under control of data in the depth map a fixed value or a value within a fixed range is generated in the occlusion data frame as an indication means to distinguish non-functional data.

Such a fixed value (for instance pure black or pure white) is then interpreted by the decoder that, even though the pixel of the occlusion data frame may have a value, namely the fixed value or a value within a fixed range, this is not to be treated as real occlusion data, i.e. it does not concern relevant video information. This allows a strong reduction in bits, and an increased coding efficiency. An added advantage is to be obtained if the fixed range is chosen as a value (for instance pure black) which typically is generated when an error is present in the image. Preferably any functional data of the fixed value or within the fixed range is replaced with a value different from the fixed value or outside the fixed range of values so as to exclude the fixed value or value range for the functional data. This can e.g. be easily performed by clipping the incoming occlusion data. Clipping will provide a 'free range' (namely the clipped values) of values, one or all of which can then be used as indication means for non-functional data.

In such embodiments the indication is then explicitly comprised in the data within the occlusion data frame, namely: certain values stand for non-functional data.

Preferably the fixed value or the fixed value range is incorporated as metadata in the video signal.

The indication means may also be in the form of a parameter inserted into the data stream which allows the decoder to distinguish non-functional data from functional data within the data of the occlusion data frame.

The invention is based on the following insights:

The depth map is generated at the acquisition side, enabling better depth maps to be made, since more and more detailed information is available at the acquisition side.

The provision of occlusion data frame for the center view frame enables, compared to generating occlusion data at the receiving side, an appreciable improvement in 3D image quality.

The ability to distinguish functional data from non-functional data, for instance and preferably by the use of fixed values in the occlusion data frame, strongly reduces the amount of data to be transmitted and increases the coding efficiency.

The data of the depth map provide a very good basis for the distinguishing of functional from non-functional data.

The invention is also embodied in an encoder for encoding a 3D video signal, the encoded 3D video signal comprising a centre view video frame, a depth map for the centre view video frame and an occlusion data frame for the center view video frame, wherein the encoder comprises inputs for to be encoded centre view data frames, depth maps for a centre view data frame, and occlusion data frames, the encoder comprises a controller, which controller, on the basis of data for depth map, controls a switch, said switch generating for the occlusion data frame data either non-functional data or functional data.

Preferably, in the control a depth discontinuity threshold is applied, wherein a depth discontinuity in the depth map being smaller than a threshold value is a determining factor. Preferably the occlusion data is generated after the depth map is encoded. This is due to the fact that occlusion data is generated if the depth discontinuity is sufficiently high (above a certain threshold) and depth discontinuities vary between the original and the coded depth map due to compression. So, if the occlusion data is not determined on the decoded depth map, the used threshold could be lower than the actual defined threshold. This could result in more occlusion data than strictly necessary, which in turn will lead to a higher bit rate.

Depth discontinuities occur when the depth value of neighboring pixels differ by a large amount. The fact that one object may be hidden behind the other can be deduced by the jumps in depth value. A sudden change is an indication of the change in the image from a foreground to a background objects, or more generally from one object to another. Smoothly changing values indicate changes within an object. The occlusion data is only generated when the depth discontinuities (i.e. the change in depth value between adjacent pixels) are larger than a threshold i.e. are sufficiently high.

Occlusion data are generated for areas "behind a foreground object", i.e. areas neighboring the lines or points where the change in depth value is above a threshold. Such areas can be easily distinguished by depth discontinuities in the image above a threshold. Preferably the threshold value is calculated from the data in the depth map. This is done in the controller. The threshold value could be alternatively be set at a fixed value, but is preferably dynamically calculated, since various images may have various contents said contents having an influence on the optimum threshold value. The controller preferably has an output for inserting the threshold value used in the encoded 3D image data. This threshold value can then be used in the decoder, thus removing the need in the decoder for establishing the used threshold.

It has been found that a further reduction in bits can be obtained by downscaling the occlusion data frame data.

The occlusion data fills the edges around foreground objects. Downscaling of the data in the occlusion data frame has shown to have only a limited effect on the quality, while yet reducing the number of bits within the encoded 3D signal.

In a preferred embodiment the controller has an input for the bit rate of the encoded occlusion data frame.

The controller can thereby adjust the parameters by which the distinction "functional" to "non-functional" and thus the amount of functional versus non-functional data in the occlusion data frames. This provides a possibility of manual intervention. In practice this can e.g. mean that the threshold value is adjusted in dependence on the bit rate such that, if the bit rate threatens to become too high exceeding an allocated bit rate for the occlusion data frame, the threshold is increased, so that the areas of the frame with functional data are decreased.

In a further embodiment the video depth map and the occlusion data frame are encoded, wherein the occlusion data frame is encoded using one or more centre view frames as a reference frame within the encoding.

It is observed for preferred embodiments that the coding efficiency of the occlusion data frame improved significantly when for the occlusion data frames reference frames(s) were used from the centre view. Initially this might sound rather surprising since the occlusion data comprise those data that are not visible in the centre view and thus are not available in the centre view frame. However, the correlation of the occlusion data with the centre view data close to the foreground object in the centre view may be high due to motion of the foreground object. Usage of reference frame(s) from the centre view for encoding the occlusion data frame has been found to improve the coding efficiency of the occlusion data significantly.

The amount of occlusion data is restricted by the video depth map. Within the framework of the invention the generation of the occlusion data frame is preferably also restricted to a maximum range of viewing angles. The amount of occlusion data is thus restricted by the video depth map and (in a preferred embodiment) by a maximum range of views or a maximum viewing angle. In such embodiments the occlusion data is limited to the data one would see given a depth map and a maximum displacement (i.e. viewing angle) to the left and right. Thus the amount of additional data, above the amount needed for the centre view data and a depth map for the centre view data, is limited, requiring only a limited amount of added bits. The controller in the decoder preferably has an input for a maximum range of viewing angles.

In the present invention occlusion data are generated at the video data collecting side.

It is remarked that it is known to generate a type of occlusion data at the receiver end. However, when this is done at the receiver end on the basis of a centre view and a depth map for the centre view, it is not possible to truly reconstruct the occlusion data, i.e. to reconstruct what is behind foreground objects, since it is fundamentally unknown what is hidden behind the foreground objects in the centre view. The occlusion data is then usually generated from the centre view by an 'educated guess' type of algorithm. The missing parts are guessed and filled in.

Furthermore, it is remarked that full 3D techniques are not or at least not easily compatible with present encoding techniques. In the present invention all encoded data relate to only one viewpoint and one coordinate system, making it more easily compatible with existing techniques.

In video signal processing the signal is comprised of intra-coded and intercoded frames, for instance I-frames, P-frames and B-frames. The I-frames are intra-coded. The P- and B-frames are referred to as intercoded frames. Intra-code frames can be reconstructed without any reference to other frames; intercoded frames are reconstructed using data of other frames (forward or backward prediction).

The invention is embodied in a method for coding, but equally embodied in corresponding encoder having means for performing the various steps of the method. Such means may be provided in hard-ware or soft-ware or any combination of hard-ware and soft-ware or shareware.

The invention is also embodied in a signal produced by the encoding method and in any decoding method and decoder to decode such signals.

In particular the invention is also embodied in a method for decoding an encoded video signal wherein a 3D video signal is decoded, the 3D video signal comprising an encoded centre view video frame, a depth map for the centre view video frame and an occlusion data frame for the center view video frame, the encoded video signal comprising indications to distinguish non-functional occlusion data from functional occlusion data wherein in the decoding a combined data stream is produced, comprising functional occlusion data and centre view data.

The invention is also embodied in a decoder for decoding an encoded video signal wherein a 3D video signal is decoded, the 3D video signal comprising an encoded centre view video frame, a depth map for the centre view video frame and an occlusion data frame for the center view video frame, the encoded video signal comprising indications to distinguish non-functional occlusion data from functional occlusion data wherein the decoder comprises a combiner for producing a combined data stream, said combined signal comprising functional occlusion data and centre view data.

These and further aspects of the invention will be explained in greater detail by way of example and with reference to the accompanying drawings, in which

BRIEF DESCRIPTION OF THE DRAWINGS

The figures are not drawn to scale. Generally, identical components are denoted by the same reference numerals in the figures.

DETAILED DESCRIPTION OF PREFERRED EMBODIMENTS

Figure 1:
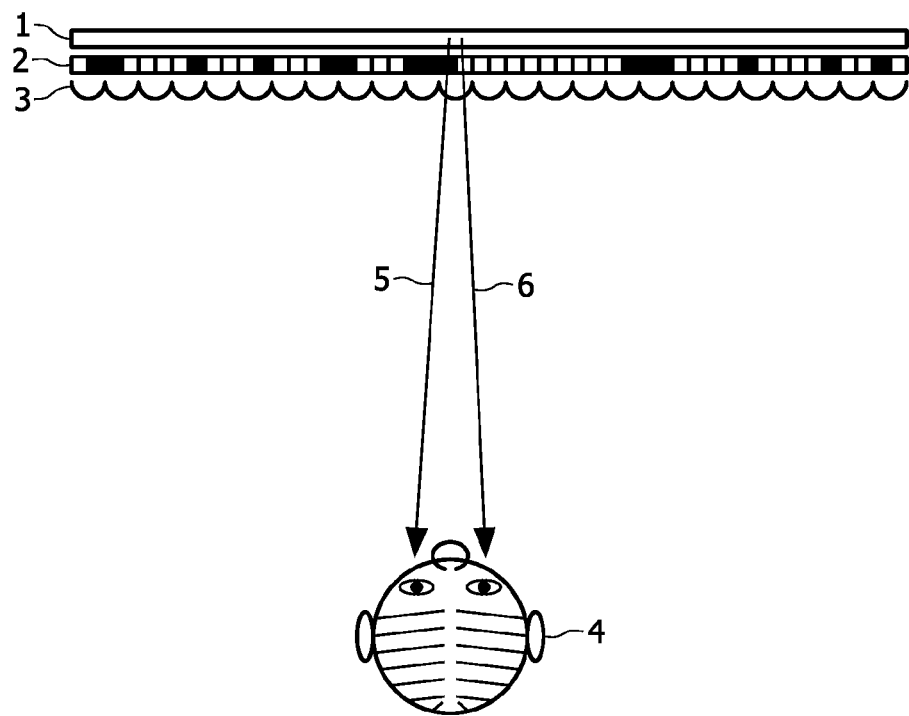
FIG. 1 illustrates an example of an auto-stereoscopic display device.

FIG. 1 illustrates the basic principle of a type of auto-stereoscopic display device. The display device comprises a lenticular screen splitting 3 for forming two stereo images 5 and 6. The vertical lines of two stereo images are (spatially) alternatingly displayed on, e.g., a spatial light modulator 2 (e.g. a LCD) with a backlight 1. Together the back light and the spatial light modulator form a pixel array. The lens structure of the lenticular screen 3 directs the stereo image to the appropriate eye of the viewer.

Figure 2:
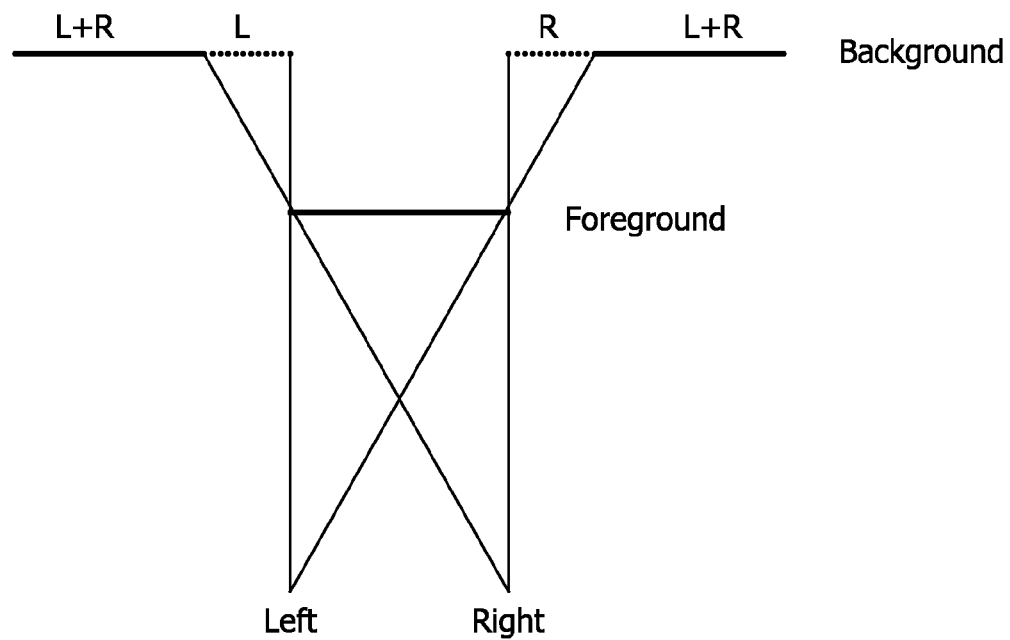
FIGS. 2 and 3 illustrate the occlusion problem.
Figure 3:
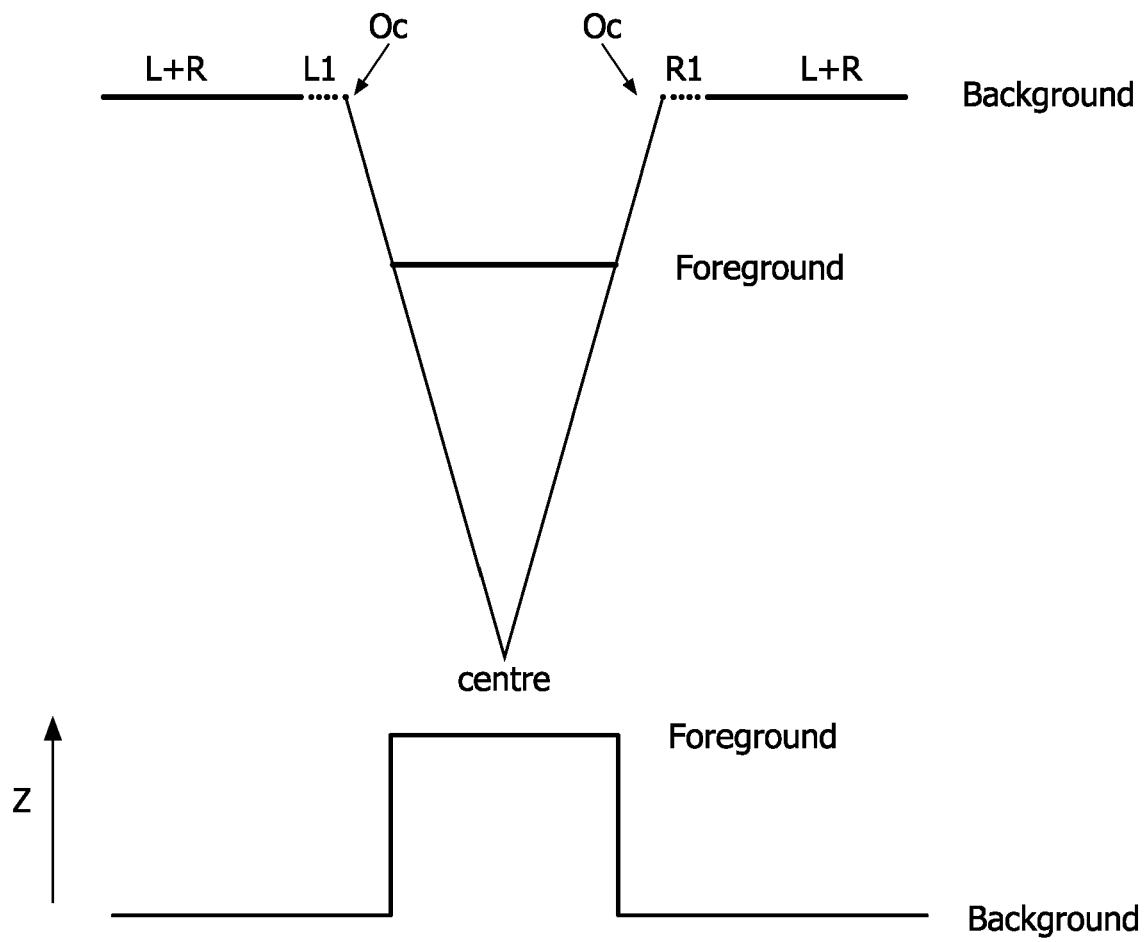

In FIGS. 2 and 3 the occlusion problem is illustrated. The line indicated with Background in this figure is the background and the line indicated with Foreground represents an object that is located in front of the background. Left and Right represent two views of this scene. These two views can be, for example, the left and the right view for a stereo set-up, or the two most outer views for the case of usage of an n-view display. The remaining n−2 views, required for an n-view display should then be generated at the display side. The lines denoted L+R can be observed by both views, whereas the L part can only be observed from the Left view and the R part only from the Right view. Hence the R part cannot be observed from the Left view, and similarly the L part cannot be observed from the Right view. In FIG. 3 centre indicates the centre view. As can be seen from this figure part (L1 respectively R1) of the L and R part of the background indicated in FIG. 3 can be seen from the centre view. However, a part of the L and R part is invisible from the centre view since it is hidden behind the foreground object. These areas indicated with Oc are areas that are occluded for the centre view but would be visible from the other views. As can be seen from the figure, the occlusion areas typically occur at the edges of foreground objects. Generating 3-D data only from a centre view and a depth map poses a problem for the occluded areas. The data of parts of the image hidden behind foreground objects is unknown.

Better depth maps in turn will enable 3D displays to produce more depth. Increase in depth reproduction will result in visible imperfection around depth discontinuities due to the lack of occlusion data. Therefore for high quality depth maps, the inventors have realized a need for occlusion data.

Figure 4:
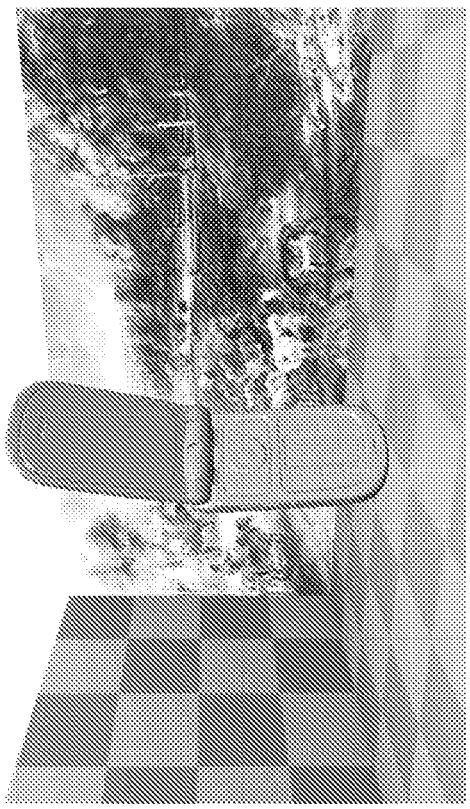
FIG. 4 shows a left and a right view of a computer generated scene.
Figure 4:
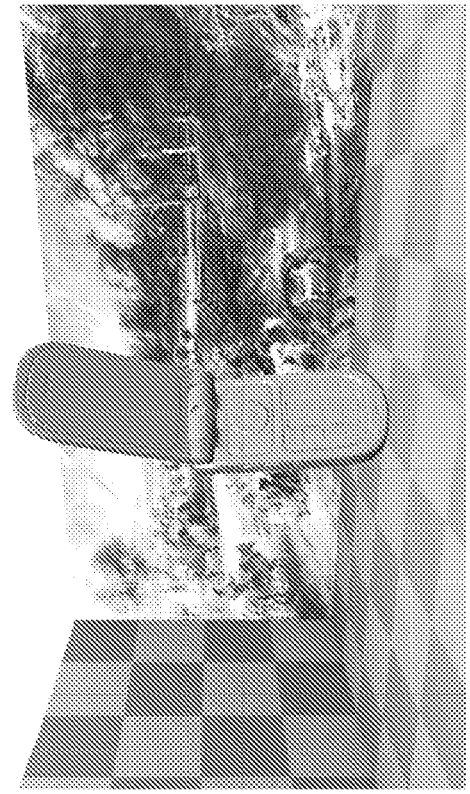

FIG. 4 shows a left and a right view of a computer generated scene. The mobile phone is floating in a virtual room with a yellow tiled floor and two walls. In the left view the farmer is clearly visible, whereas she is not visible in the right view. The opposite holds for the brown cow in the right view.

Figure 5:
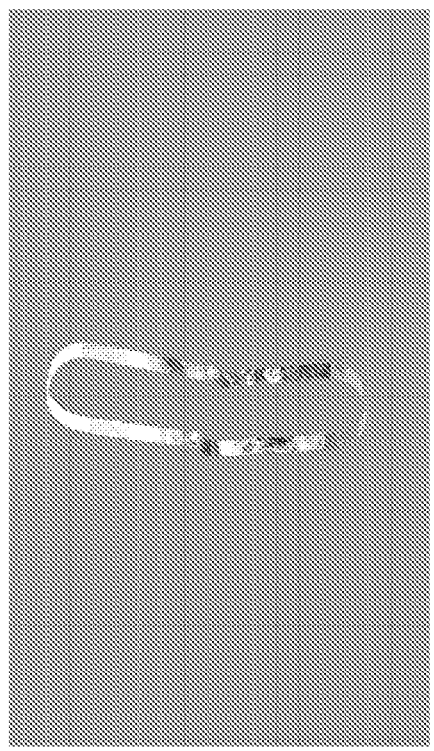
FIG. 5 illustrates a representation of FIG. 4 in three data maps; centre view, depth map for centre view and occlusion data for the centre view.
Figure 5:
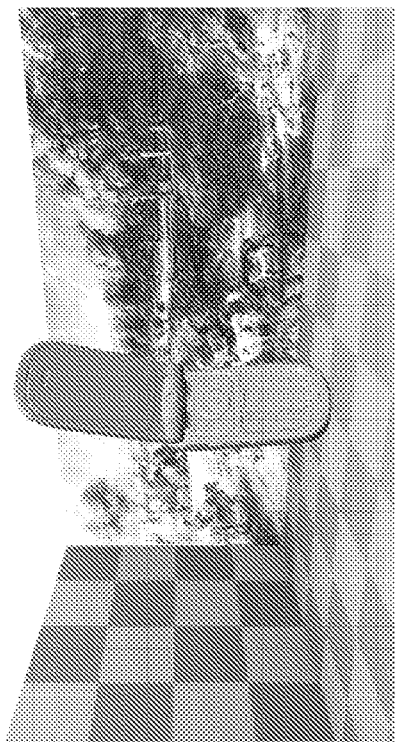
Figure 5:
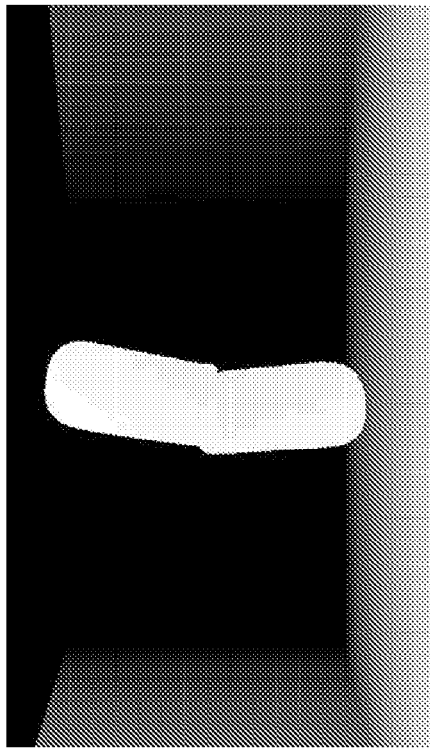

In FIG. 5 we have the same scene as discussed above. The scene is now, in accordance with the invention, represented with three data maps, a map with the image data for the centre view, the depth map for the centre view and the occlusion map for the centre view, wherein the occlusion data are determined by the video depth map. The extent of the functional occlusion data is determined by the depth map. Basically it follows the lines of steps in depth in the centre view. The areas comprised in the occlusion data are formed in this example by a band following the contour of the mobile phone. This band (which thus determines the extent of the occlusion areas) may be determined in various ways:

- as a width following from a maximum range of views and the step in depth.
- as a standard width
- as a width to be set
- as anything in the neighborhood of the contour of the mobile phone (both outside and/or inside).

The depth map is a dense map. In the depth map light parts represent objects that are close and the darker the depth map is the farther away the object is from the viewer.

The functional occlusion data is, within the example of the invention illustrated in FIG. 5 to a band of a width which corresponds to limiting to the data to what one would see given a depth map and a maximum displacement to the left and right. The remainder of the occlusion data are not functional.

Most of the digital video coding standards support additional data channels that can be either at video level or at system level. With these channels available, transmitting of occlusion data can be straightforward.

Figure 6:
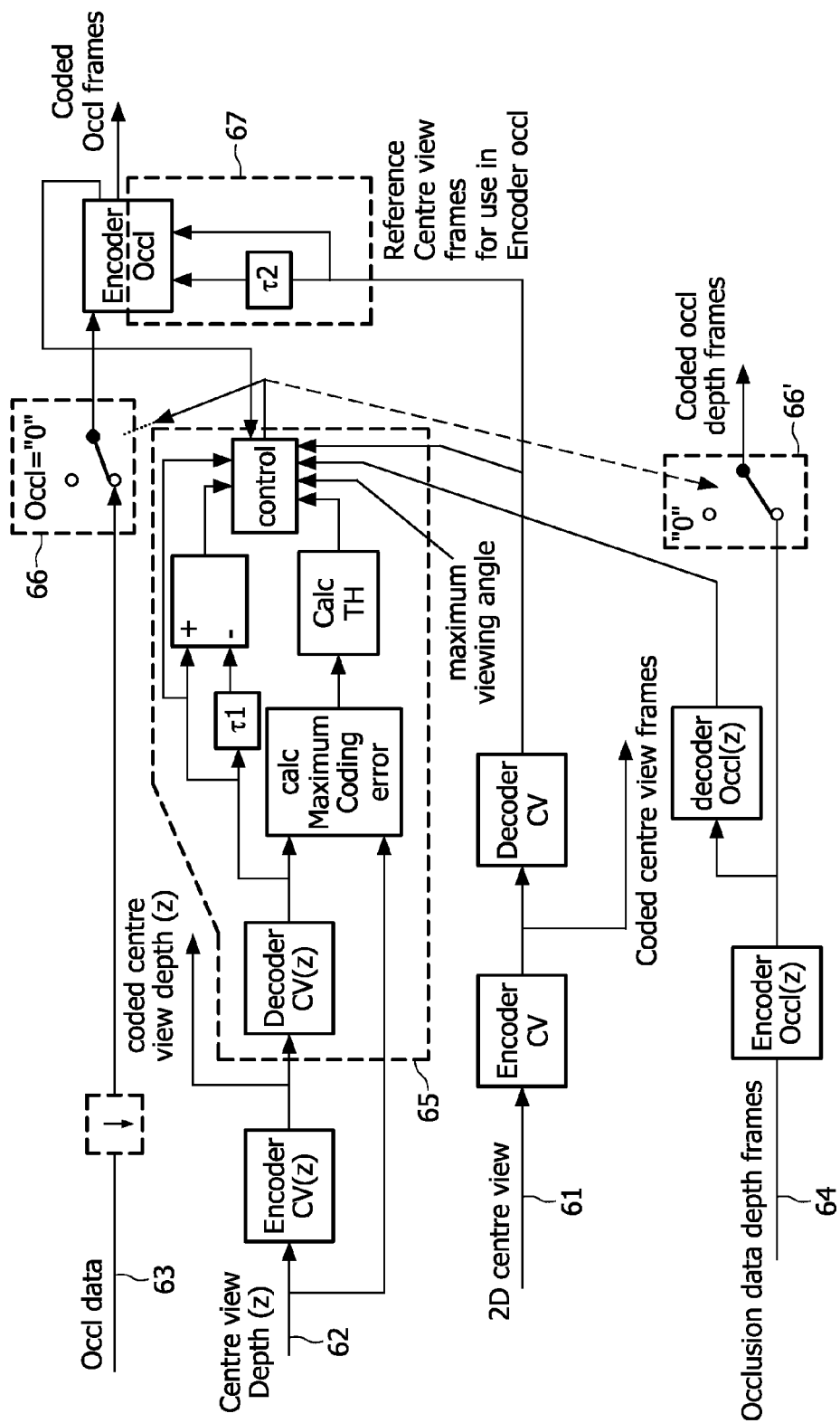
FIG. 6 illustrates a coding scheme and an encoder in accordance with the invention.

FIG. 6 illustrates an embodiment of an encoding method and an encoder in accordance with the invention. The encoder receives three data streams, data 61 providing the data for the centre view, data 62 providing the depth map for the centre view and data 63 providing the occlusion data. For each of these data streams there is an encoder, for the centre view data encoder Encoder CV, for the depth map of the centre view data Encoder CV(z), for the occlusion data Encoder Occl, and finally for the optional depth map for the occlusion data Encoder Occl(z). The occlusion data frame may be a large set of data.

The data may also comprise a depth map for the occlusion data as schematically shown in the lowest part of FIG. 6.

The centre view depth map data is provided to a controller 65, wherein the controller 65 regulates a determinator or switch 66. Depending on the output of the controller 65 the data in the occlusion data frame is distinguished between functional data (i.e. data that is to be treated as true occlusion data in the rest of the encoding method and the later decoding) and non-functional data, i.e. to be functionally disregarded. In FIG. 5 the nonfunctional areas are gray. The non-functional data is schematically indicated in FIG. 6 by: Occl="0". The most direct way of dealing with this is to assign to the data for the non-functional areas a fixed value (for instance pure black). Throughout the rest of the encoder and in the decoder, these non-functional data will then be recognized as being non-functional. Within the controller a threshold TH is preferably set or calculated. Preferably the fixed value or value within a fixed range is reserved for non-functional data, and any functional data of the fixed value or within the fixed value range is replaced with a value other than the reserved value or outside the reserved range.

If pure black (Y value of 0) would indicate non-functional data, any non-functional data will be distinguished by the decoder as non-functional data, but any data in the functional area that would, by pure chance, also be pure black would also be seen as "non-functional" data and as a consequence small holes may form in the functional areas. By reserving pure black for non-functional data, this negative effect would be prevented. This can easily be performed by clipping the incoming occlusion data (running from for instance luminance values between 0 and 255) to e.g. a luminance value of 4. All pure black signals (or any signal with a Y value 0, 1, 2 or 3) in the incoming occlusion data would be made slightly less black, i.e. the "pure black" value of such pixel is replaced with a value (in this example by means of clipping) other than the reserved value or outside the range of reserved values. "Pure black" would then be reserved for non-functional data. In this example one could also reserve the range Y=0, 1, 2 or 3 for non-functional data. The resulting 3D video signal is relatively easily recognized as being made by the method in accordance with the embodiment of the invention since many occlusion data frames will have relatively large areas all being 'pure black', while the remaining areas show a range of values, and none of the pixels within the remaining areas are 'pure black'.

By restricting the functional occlusion areas on the basis of the video depth map the number of additional data is kept in bounds. The depth map is preferably first encoded and thereafter the occlusion data are coded, wherein the data for the depth map are used to make a distinction between functional and non-functional data. Depth discontinuities occur when the depth value of neighboring pixels differ by a large amount. The fact that one object may be hidden behind the other can be deduced by the jumps in depth value. A sudden change is an indication of the change in the image from a foreground to a background object, or more generally from one object to another. Smoothly changing values indicate changes within an object. The occlusion data is only generated when the depth discontinuities (i.e. the change in depth value between adjacent pixels) are larger than a threshold i.e. is sufficiently high. In a particular embodiment, a maximum coding error is determined (which sets a lower limit for the threshold TH, there is no use in setting the threshold TH below occurring coding errors) a threshold TH is calculated. In the control TH the threshold is compared to differences in depth between pixels, which is schematically indicated by the subtraction block 67. To this block is fed, decoder depth map data and neighboring depth map data (schematically by shift τ1 in FIG. 6). When the step in depth between neighboring pixels is larger than the threshold TH, the step indicates a 'true edge' in the data. A comparison between on the one hand a measured step in depth, or depth discontinuity and on the other hand the calculated threshold value TH is thus made and a determining factor in the control. From the true edges, the position of foreground objects can be determined, and thereby the limits of functional occlusion data areas. The controller 65 controls the switch 66 accordingly. When a pixel of the occlusion data frame belongs to a non-functional part of the frame, the data is distinguished as being non-functional.

This has the advantage that functional occlusion data will be generated and dealt with in the occlusion encoder only for parts of the occlusion data frame which are functional occlusion data. Filling in of occlusion areas for depth discontinuities below a lower threshold, which are usually small, can be solved by other techniques, for instance stretching.

Preferably the occlusion areas are determined by a minimal depth discontinuity as well as a maximum range of views or maximum viewing angle that will be generated at the display side. In FIG. 6 this is indicated by the line between the words "maximum viewing angle" and the box "control". The latter constraint determines the bandwidth of the occlusion areas in the occlusion map, i.e. how far behind the foreground image one needs to be able to look. Apart from the maximum viewing angle, the bandwidth may also be dependent on the actual depth value, which is the reason for the line going from the decoder to the control.

FIG. 6 also illustrates the following: The controller has as inputs the encoded/decoded depth map data. One could use the original data, i.e. directly feeding the control and other parts with the original data. However, at the decoder side, the original data are no longer available, only encoded, usually strongly compressed data. The data are decoded, so at the decoding end the encoded signal must be used. For instance functional occlusion data is generated if the depth discontinuity is sufficiently high (above a certain threshold) and depth discontinuities vary between the original and the coded depth map due to compression. So, if the occlusion data is not determined on the decoded depth map, the used threshold should be lower than the actual defined threshold so as not miss functional data. This could result in more occlusion data than strictly necessary, which in turn will lead to a higher bit rate.

The areas in the occlusion data frame that do not comprise useful occlusion data (the grey areas in the FIG. 5) are distinguished as non-functional and they do not play a part in the encoding as such. A simple way of doing this is, as explained above, to assign a fixed value to such pixels, for instance pure black or pure white. To the non-functional occlusion data extreme measures and methods of compression, which would not be justified for functional occlusion data due to possible loss of information with the consequential loss of image quality, may be applied which allows a strong reduction of the amount of bits in the encoded occlusion frame signal and in the transmission and also an increase in coding and decoding efficiency, without a reduction in the final image quality. To the data distinguished as non-functional any form of (variable length) coding which will provide a minimum number of bits can be applied. Since the maximum depth is known from the depth map and the maximum viewing angle is known the maximum occluding area can be calculated. In further preferred embodiment measures can be taken to improve coding efficiency. A further preferred embodiment is e.g. given by the line between the encoder occl and the control. An input of the bit rate of the coded occlusion frame can be used to control switch 66. If the bit rate threatens to exceed a set value, the control of switch 66 could be made more severe, meaning that for instance the threshold TH is increased, and/or the maximum range of views is reduced. This will, of course lead, to a decrease in size of the functional areas and an increase in the percentage of non-functional data in the occlusion frames. That may have a negative effect on the image at the display; however, the positive result is that the bit rate of coded occlusion frame is kept in bounds. Overall, the net result is positive. If the occlusion depth frame is available, information of this occlusion depth frame could also be used in the controller 65 to 'fine tune' finding the edges in the images. An alternative may be, in those embodiments where the occlusion data are not automatically downscaled; downscaling is triggered if the bit rate threatens to exceed a set value.

A further embodiment includes an additional input of centre view data in the controller. When around an edge in the centre view, the centre view image is very smooth, i.e. showing little detail, especially when all around a foreground object a smooth background (for instance a simple color without texture) is present stretching will likely give good results. Stretching is an operation done at the decoder side, which does not require bits to be sent. In such circumstances, instead of declaring the occlusion data functional, the occlusion data (although the step height may be high enough) may be designated as non-functional. This saves bits, while the negative effect is likely minimal.

All parameter data used in the method of encoding such as the threshold TH, the fixed value for non-functional data (or the fixed range), the shifts τ1 and τ2 and parameters such as the maximum viewing angle, the bitrate of the coded occlusion data used in the control may be sent with the encoded data stream as metadata. At the decoder side the parameters are then used in a similar way.

FIG. 6 also illustrates a further preferred embodiment: the encoder comprises an encoder (encoder CV) for encoding centre view frames and a decoder (decoder CV) for decoding encoded centre view frames, an encoder (encoder occl) for encoding the occlusion data frames and an input at the encoder for encoding the occlusion data frames for inserting decoded centre view frames as reference frames. This is schematically shown by the line going from decoder CV to encoder occl. Preferably not just the centre view frame from the same time is used as a reference frame, but a time (or frame) shift is used, i.e. one or more previous or future centre view frames are used as reference frames in the encoder for occlusion data frames. It is observed that the coding efficiency of the occlusion data improved significantly when for the occlusion data reference frame(s) were used from the centre view. Initially this might sound rather surprising since the occlusion data comprise those data that are not visible in the centre view at current time instance and thus are not available in the centre view frame. However, the correlation of the occluding data with the background data close to the foreground object is high. Usage of reference frame(s) from the centre view for encoding the occlusion data frame has been found to improve the coding efficiency of the occlusion data significantly. This is schematically indicated in part 67.

The line going from the control to a switch 66' in the line indicating the data for the depth map of occlusion frames indicate that, if some occlusion data itself are distinguished as non-functional, the same operation may be applied to the corresponding depth data for the occlusion frame. This will allow a reduction in bits in the depth map for the occlusion data. In principle it would be possible to use only switch 66', but the most important reduction in bits is obtainable in the occlusion frames more than in the depth map for the occlusion frames. It is possible to use the data in the depth map of the occlusion data frame as a means to distinguish in the occlusion data frame itself the non-functional area. This would allow for instance to identify non-functional areas in the occlusion data frame by the content of the depth map for the occlusion data frame. Such non-functional areas are then no longer restricted in the values and can thus be used for storing of other information. It is to be noted that "non-functional" means not comprising values relevant for the pixel value. The indication means for indicating non-functional areas in the occlusion data frame are then encompassed in the encoded depth map for the occlusion data frame.

Figure 7:
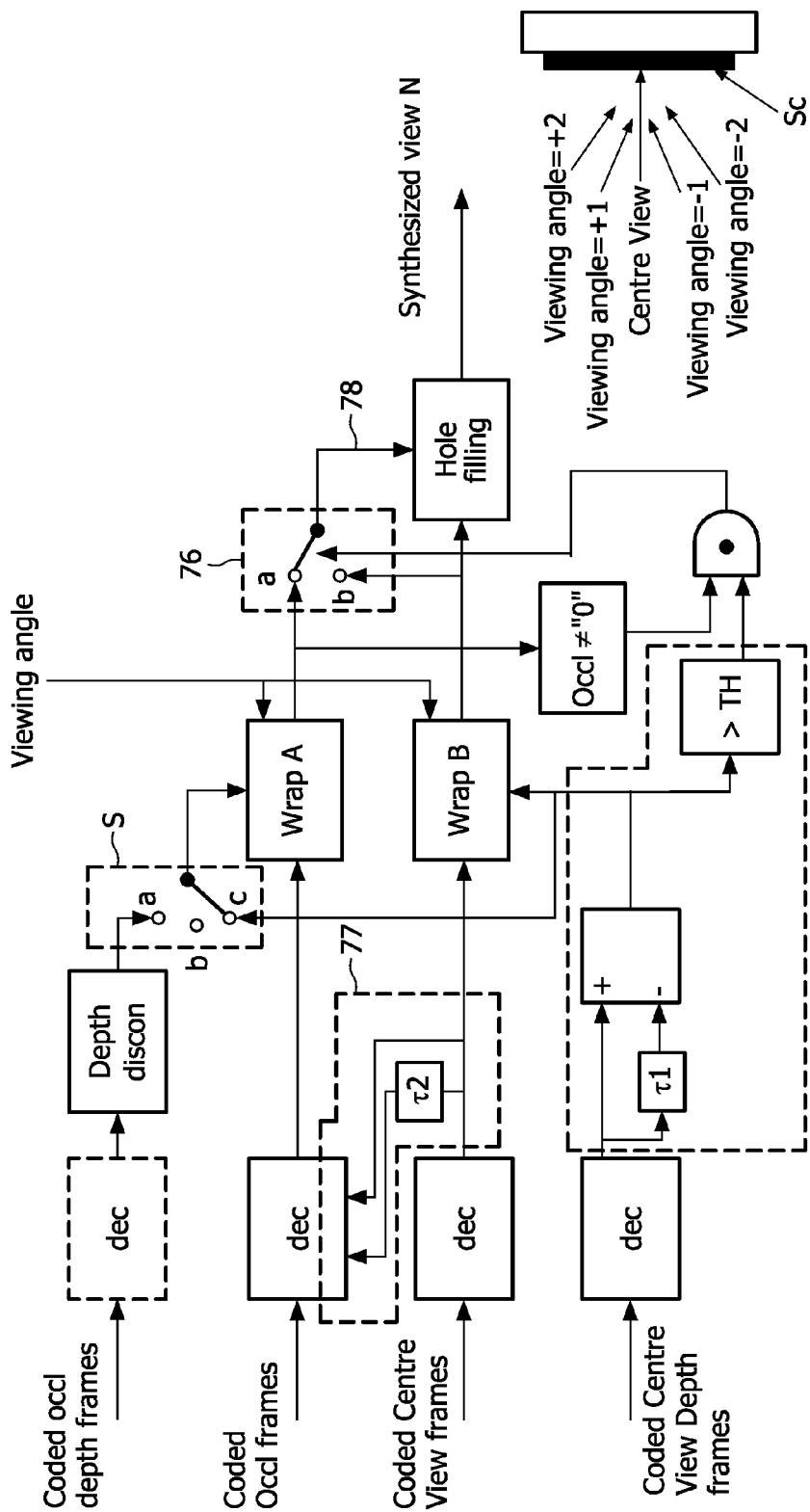
FIG. 7 illustrates an embodiment of a decoding scheme and a decoder in accordance with the invention.

FIG. 7 illustrates a decoding method and a decoder in accordance with the invention. Parts of the decoder that grosso modo correspond to parts of the encoder are indicated by a number that is 10 higher than the number in FIG. 6.

Figure 8:
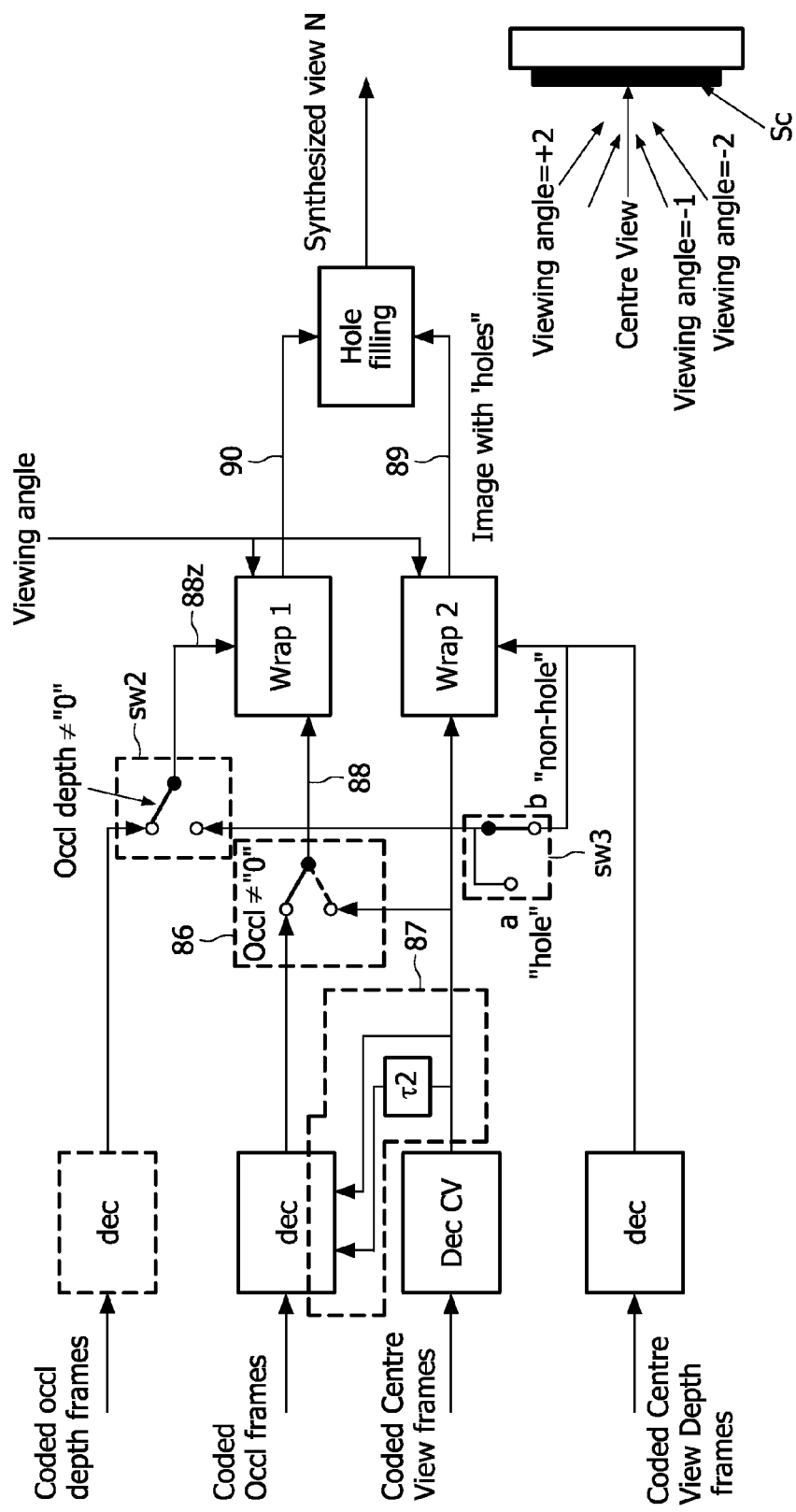
FIG. 8 illustrates another embodiment of a decoding scheme and decoder in accordance with the invention.

The most right hand part in FIGS. 7 and 8 illustrate different views on a screen Sc, The centre view is a view straight on the screen; other views are made by changing the viewing angle, schematically and by means of example being indicated by a viewing angle index ranging from +2 to −2.

Here the center depth discon (discontinuity) controls the warping block (basically performs shifting of the pixels). The amount of warping also depends on the desired viewpoint position N, wherein to each view point position a viewing angle corresponds. Basic warping leaves 'holes' in the resulting pixel frame.

When the occlusion depth data are available, the decode occlusion is also warped using the occlusion depth discontinuity via switch S which is now in position a.

When now warped occlusion information is available, meaning it is not equal to "0" (which can be also defined as a small interval) this occlusion information can be used to fill the "hole" in the centre view (switch 76 in position a). Otherwise the "hole" is filled, by copying from the edge of the "hole", (switch 76 in position b), e.g. by stretching.

The "0" range is being transmitted by the encoder ENC, and being received by the decoder DEC so its value is known and it can correctly control switch 76.

When there is no occlusion depth information available, switch S is normally in position c, meaning the center depth is used instead. When the center view discontinuity makes a jump (larger then a threshold TH), the depth discontinuity is repeated, indicated by switch S in the b position.

The threshold TH is also being transmitted by the encoder ENC in the complete stream as metadata (see also FIG. 6) and also controls switch 76, for where to take the data to fill the 'holes' of the warped center images. When the center depth discon is smaller then TH, the switch 76 is in position b. Signal 78 is a combined signal comprising both functional occlusion data as well as centre view data, wherein the position of the switch 76 determines the combining.

FIG. 8 illustrates a further embodiment of a method of the coding and a decoder in accordance with the invention.

The centre view is decoded in decoder for the centre view DEC CV. The decoded CV will provide a centre view image, to generate images at different angles a warp (distortion operation) is done in warp 2. This will give an image with "holes". The objects in the centre view obstruct certain parts of the background, which now should become "visible". However the data for the centre view image do not comprise data for these "holes" parts. These holes have to be filled in the hole filling operation. In conventional methods this is for instance done by stretching, i.e. the value of pixels around the "hole" is used to make an educated guess of the content of the pixels in the hole. However, this does not really portray what was behind the foreground image, but merely make a guess.

In the invention, the coded occluded data frame is used. At position 88 a combined data stream is produced. The combined data stream comprises on the one hand functional occlusion data, as well as data from the centre view. The switches have a first position (for functional occlusion data, in the figure schematically indicated by occl≠"0") which passes functional occlusion data. Switch 86 provides the same function as switch 76 in FIG. 7. If the data is distinguished as non-functional, the switch 86 is put in a position in which the centre view data is passed. The result is a combined data stream 88 comprising centre view data as well as parts which are derived from the occlusion data frame, said parts comprising the functional occlusion data. Switches 76 and 86 are thus combiners which, triggered by the distinction between functional and nonfunctional data and possibly further parameters, produce a combined signal 78, 88 comprising a combination of functional occlusion data and centre view data. This combined signal is used for filling holes.

This signal 88 is now "warped" by warp1. If an occlusion depth stream is available, the depth information used by warp1 is taken from the decoded occlusion depth stream. Otherwise the depth information used by warp1 is derived from the center view depth signal. For non-"hole" positions, the decoded center view depth signal is passed via switch sw3 and switch sw2 to the warper warp1.

At "hole" positions, switch sw3 is in the "hole" position and the cv depth signal is repeated (or alternatively the eroded cv depth signal is used), until the next non-"hole" position.

It is an option for the decoder to just repeat the last known depth value just before the "hole", however, since this position is usually very close to a larger depth jump, and therefore it may contain certain coding artifacts, which could lead to inaccurate depth values for the 'holes'. The encoder can detect such situations at such places e.g. by measuring the depth error of the values to be repeated and reduce the errors by encoding them with higher precision (e.g. by decreasing the Qsc value). On the other hand, the decoder could take measures as well by not just repeating the last depth value, but by e.g. repeating the median or average value from a small series of depth values just outside the 'hole'.

In warp 1 a distortion is applied to the compound data stream. This warped compound image is used in the hole filling operation to synthesize the various views from various angles. Since the compound data stream comprises the functional data from the occlusion data frames a much more accurate filling of the holes is possible resulting in improved image quality. It is to be noted that certain "holes" within the warped centre view image will still be filled by stretching. For instance in embodiments, for small step height, below the threshold, the occlusion data are non-functional, and thus compound data stream comprises the centre view data, since the switch is set such that the centre data is passed. For clarity it is remarked that, where in the description mentioned is made of a switch, the switch can be composed of any piece of hardware, software or any computer code for performing the function. The advantage is that, on the one hand, for such situation hole filling is a very good and efficient procedure, while, on the other hand, by restricting the functional occlusion data, allowing the non-functional occlusion data to be compressed in extreme measures, coding efficiency can be increased. The main difference between the embodiments of FIGS. 7 and 8 is that in FIG. 7 warping are performed prior to producing a combined signal, while in FIG. 8 the combined signal 88 is produced prior to warping. Furthermore, in FIG. 8 also a combined depth signal 88z is produced.

Figure 9:
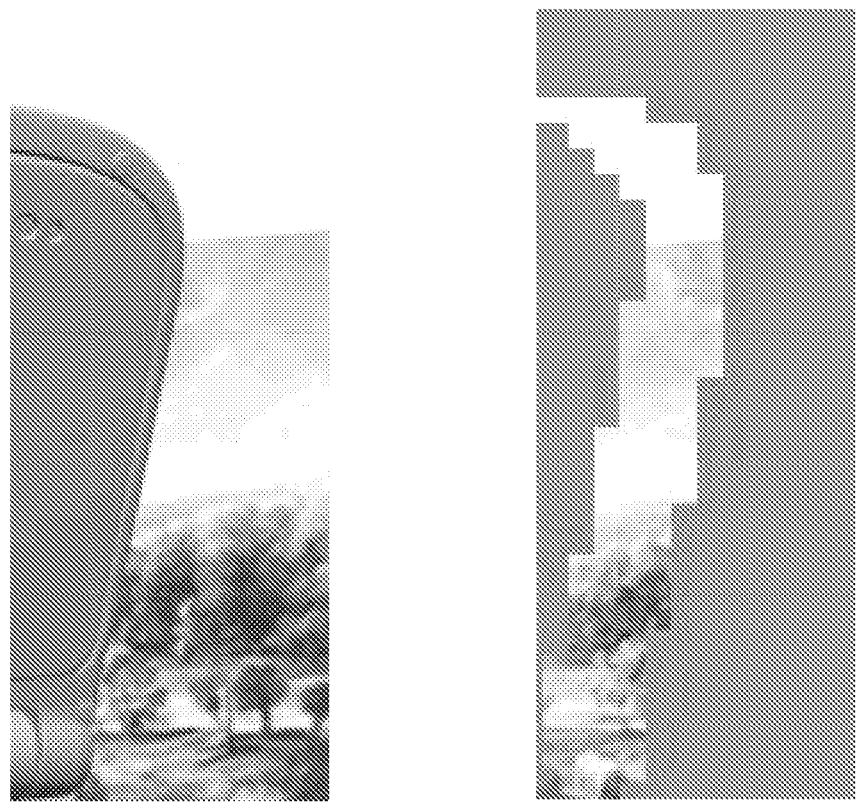
FIG. 9 illustrates a zoom-in on centre view data and occlusion data wherein the block grid alignment of the occlusion data is visible.

Preferably the occlusion data is block grid aligned. This will enable an improved coding efficiency. FIG. 9 illustrates a zoom-in on centre view data and occlusion data wherein the block grid alignment of the occlusion data is visible.

The occlusion data is to be encoded preferably using known techniques.

In the invention the occlusion data may be encoded using reference frames from the center view. Within the framework of the invention it has been found that the spatial and temporal correlation of the occlusion data is much lower that the correlation in for example the centre view. It is observed that the coding efficiency of the occlusion data improved significantly when reference frames(s) were used from the centre view. Initially this might sound rather surprising since the occlusion data are not available in the centre view. However, the correlation of the occluding data with the background data close to the foreground object, but shifted in time, is high. So usage of reference frame(s) that are possibly shifted in time from the centre view for coding the occlusion data will improve the coding efficiency of the occlusion data.

In FIG. 9 an enlarged part of the mobile scene is depicted. It is clearly visible that the correlation between the occlusion data and the background data in the centre view is high. Exploiting this spatial correlation between on the one hand the central view data and the occlusion data reduces the bit rate significantly. Within the MPEG standardization body, for instance H.264 MVC (multi view coding) have some basic principles to enable usage of reference frames cross views that have good performance. The approach of MVC is based on tools that use generalized B-frames, exploiting the correlation between the views captured with multiple cameras. These tools can be applied for the purpose of using reference frames from the centre view for coding the occlusion data.

In a further embodiment we can have one view or more views containing the centre view and a second view containing the occlusion data and code this stream using H.264 MVC with generalized B-frames. This implies that we do not have to design a new coding standard, in this case the MVC standard is used differently which should be flagged in the standard.

Figure 10A:
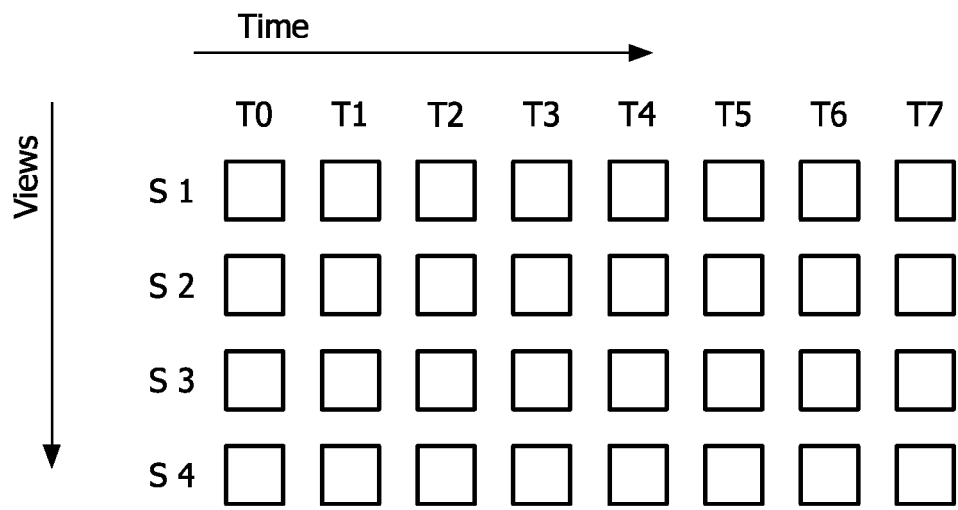
FIG. 10 illustrates encoding/decoding schemes.
Figure 10B:
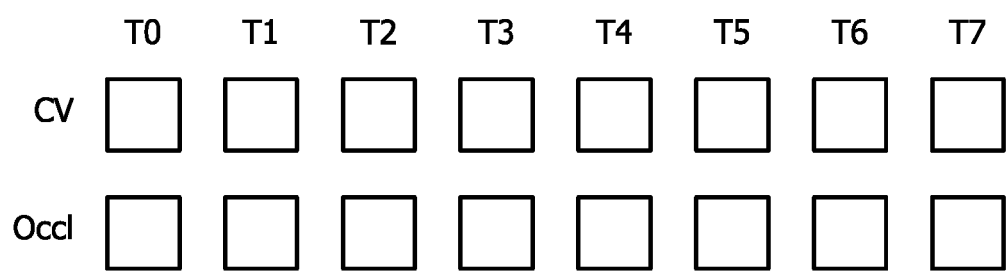

FIG. 10 schematically illustrates an MVC coding scheme, for times T0, T1 etc, different views are s1, s2 etc are transmitted, as shown in part A of FIG. 10. Part B of FIG. 10 schematically illustrates how a similar scheme can be used in encoding the centre view frame (CV) and the occlusion data frame (Occl).

Using generalized B frames in one encoder and/or MVC however has 3 important limitations; the frame-rate and resolutions have to match, and the use of existing standards/silicon.

Some more complex video compression standards such as the AVC compression standard have a possibility of many multiple predictions. A relatively large number of temporal (i.e. forward or backward) predictions are made. Not just the nearest frames in time are considered for making the predictions, but also frames further away in time. In a buffer several frames are stored in a memory to be used for temporal predictions. This principle is applied within the framework of the first aspect of the invention embodiment.

Figure 11:
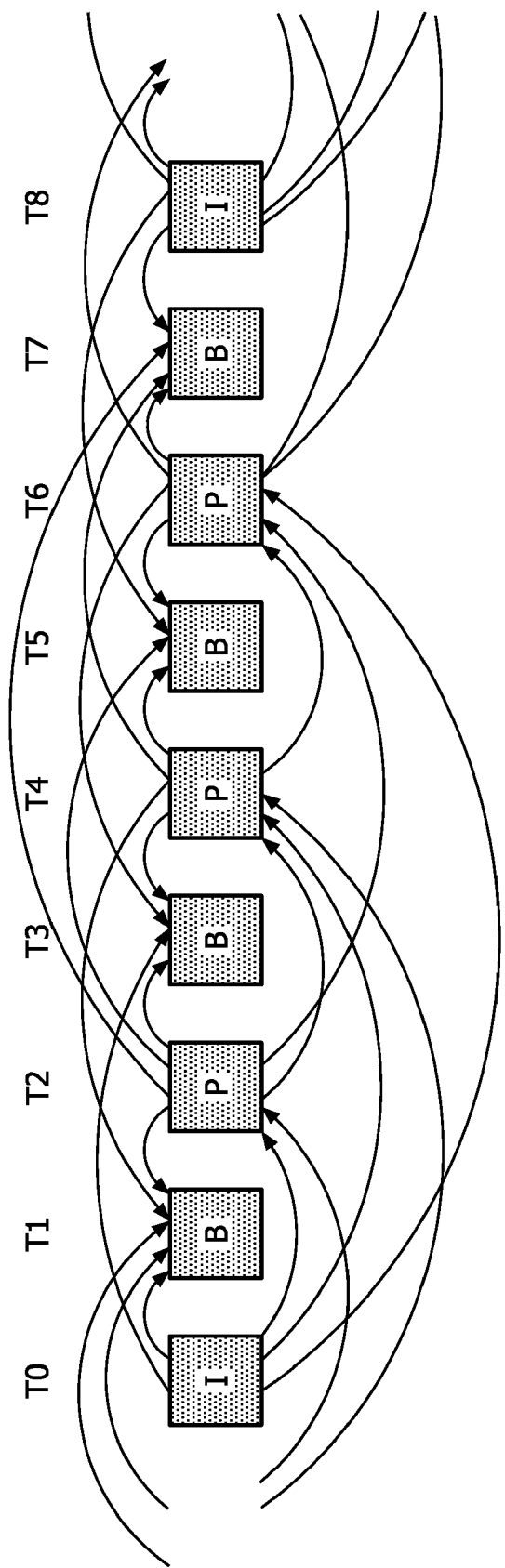
FIGS. 11 and 12 illustrate further encoding/decoding schemes.

FIG. 11 illustrates schematically multiple references. Arrows indicate the referencing between frames, the number of arrows is the number of frames used. The times T0, T1 etc stand for display order. In this figure we see for instance that in the encoding (and likewise in the decoding) for frame P at time T4, frame I at T0, frame P at T2 as well as a yet earlier frame, are used as reference frames. This is indicated by the arrows going to frame P at T4. The frame P at T4 itself is a reference frame for frame B at T3 (backward) and frame P at T6 (forward). In FIG. 11, I and P refer to Intra and Predictive coded frames, whereas B refers to Bi-directional predicted frames. The arrows indicate the predictions. In the case depicted in FIG. 11 at time instance T5 for example, predictions from the frames on time instance T2, T4, T6 and T8 are used.

Figure 12:
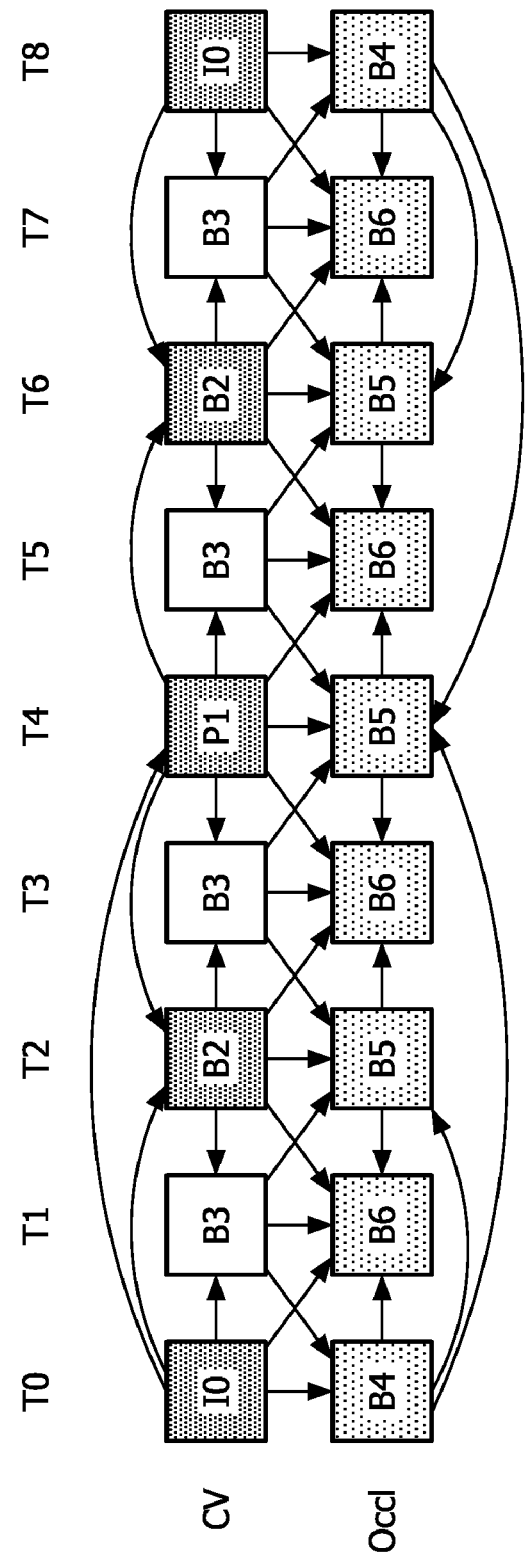

FIG. 12 provides a schematic illustration of a preferred embodiment of the invention.

We see that there are two types of frames centre view frame and occlusion data frames. As in FIG. 11 centre frames are used as reference frames for centre frames, likewise occlusion data frames are used as reference frames for forwardly and backwardly predicting occlusion data frames.

It is remarked that at each time T0, T1 etc, the correlation between occlusion data frame and centre view frame, at the same location and in case of muting, is limited, since the occlusion data frame comprises those data that are not in the centre view. However, it has been found that it provides an appreciable increase in coding efficiency if the centre view frame are used as a reference frame for the occlusion data frame, this is schematically indicated in FIG. 12 by the arrows going from the centre view frames (the upper blocks) to the occlusion data frames (the lower blocks). In this FIG. 12 I refers to Intra frame coding, P frames refer to predictive frames and B refers to Bi-directional predicted frames. The indexes relate to the layer in which the frames are. Images can only be predicted from a lower layer. So the occlusion data at time instance T0 can only be predicted from images in the centre view, whereas the occlusion data at time instance T2 can use all images of the centre view plus the occlusion data on T0 and T8. The number of reference frames that will be used will be used can be specified. This limitation is introduced from an implementation point of view, not from a conceptual point of view.

So usage of centre view reference frames for coding the occlusion data in order to obtain a higher coding efficiency is the basic principle in this embodiment of the invention.

This had already been indicted in FIG. 6 by the line between the decoder CV and the encoder occl.

Within the framework of the invention the frames stored in encoding for the prediction of the occlusion may include previous occlusion frames in addition to previous or following center view frames. Use of centre view frames does not exclude the possibility of also using occlusion data.

Using generalized B frames in one encoder and/or MVC however has 3 important limitations; the frame-rate and resolutions have to match, and the use of existing standards/silicon.

Figure 13:
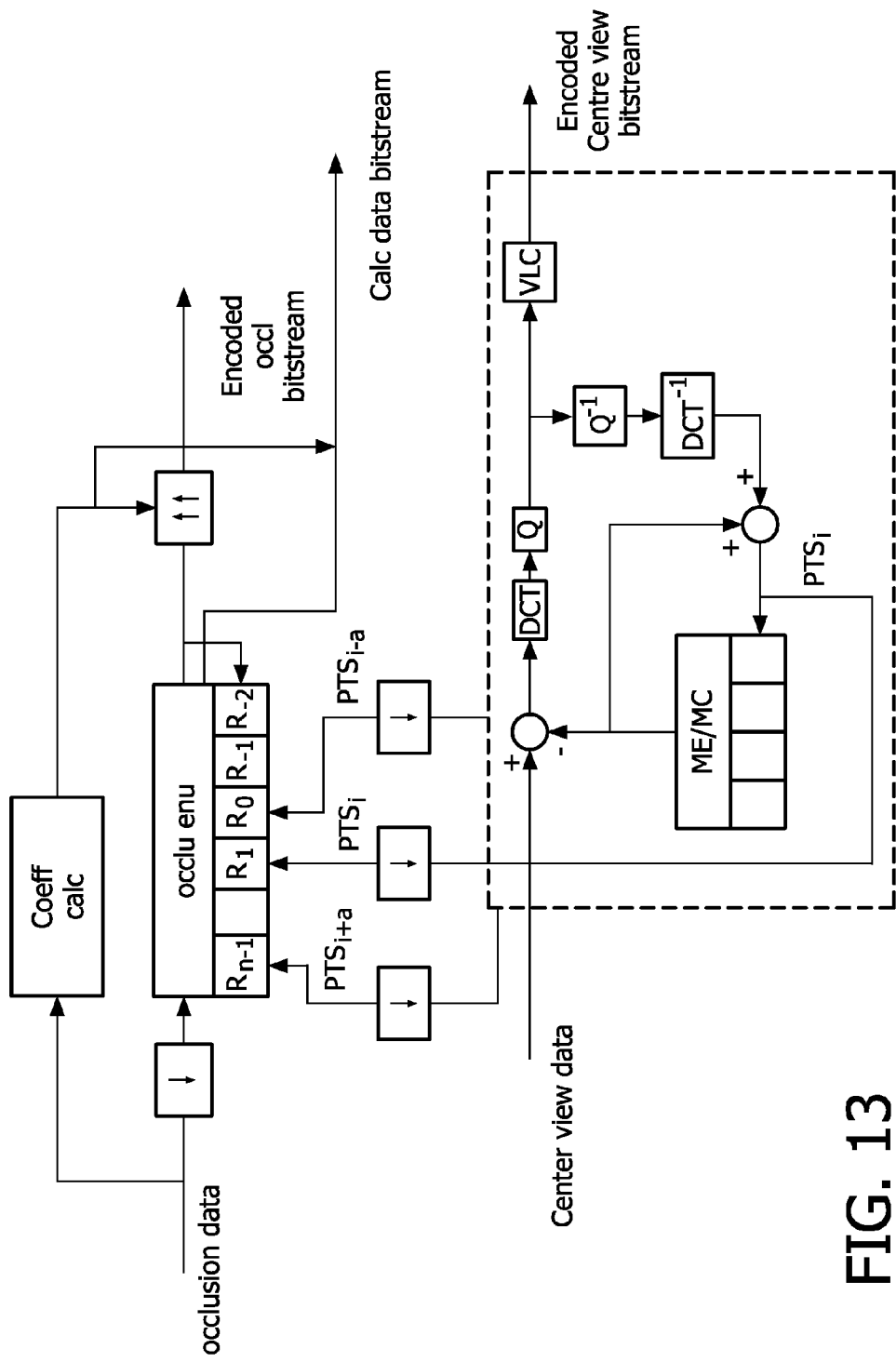
FIG. 13 illustrates a coding method using centre view frames as reference frames in coding occlusion frames.

FIG. 13 illustrates a diagram on how these principles can be applied for the joined coding of centre view images and the occlusion data images, which corresponds to the preferred embodiment schematically indicated in FIG. 6 by box 67. The occlusion data images can now be compressed at reduced spatial (and even temporal) resolution, in order to be able to operate also at very low overhead settings. In case of reduced spatial resolution the optimal upfilter coefficients can be determined and transmitted with the encoded occlusion data bitstream. In case of temporal resolution (frame-rate) reduction, known temporal upconversion techniques (like natural motion) can be use for the 3d-rendering process.

In the bottom part of the figure a possible scheme for encoding the centre view data is depicted.

The abbreviations used in the FIG. 13 stand for:
DCT: Discrete Cosine Transform
Q: Quantization
$DCT^{-1}$: inverse Discrete Cosine Transform
$Q^{-1}$: inverse quantization
VLC: Variable Length Coding ME/MC: Motion estimation/Motion compensation
R0, R1 etc: frames in the memory used in the encoding
PTSi: Presentation Time Stamp i The implementation of this schema boils down to changing memory pointers at well defined time instances. Of course the number of frames used from the centre view data layer could be any number, but it seems practical (memory limitations, as also would be the case with e.g. the MVC embodiment) to have some limitations.

Good choices look to be the current frame (PTSi) and offset of value a frames (e.g. a=5), so frame PTSi-a, i.e. a previous centre view frame. One could even think of looking into the future e.g. PTSi+a, i.e. using a future centre view frame for prediction of content of occlusion frames. There may also be more offsets, for instance a=−5, −2, 0, 2, 5. Also the weight of the offset centre view frames may show a variation. The offset number corresponds to the shift $\tau 2$ in FIG. 6. The shift $\tau 2$ is a shift illustrating a shift in time, while the time stamp offset is a shift in frames (and thus also in time). In FIG. 6 a single shift $\tau 2$ is schematically shown. It will be clear that more than one shift $\tau 2$ (as there may be more than one previous or future centre view frames used as reference frame) may be used. Within the concept of the invention the reference frames may comprise centre view frames, as well as previous occlusion data frames. The offset number(s) a, and possibly the weight of the corresponding referenced centre view frames may be determined on the basis of previous video content, for instance dependent on the movement of the foreground object in respect of the background and the direction thereof, the offset number being smaller when fast motion is determined in the horizontal direction and larger when slow motion in this direction is determined and several previous frames being used, wherein the weight diminishes as the frames are older.

In embodiments wherein the shifts or offsets and/or weights are calculated, such information is preferably incorporated into the video signal, for instance as metadata. This would remove the need for corresponding calculation steps at the decoder side.

Calculating shifts or offset numbers and possibly the weights could be done on the basis of the original data in the image, but is preferably done on encoded/decoded frames. At the decoder side, the original signal is no longer available. Also, as is shown in the figure, the encode/decode frames form the reference frames, so any parameters used in the calculation preferably relate to these frames.

Depending on the determined motion and the direction thereof also occlusion frames may form reference frames, which in FIG. 13 are schematically indicated by the line going from the encoded occlusion frames line to the memories $R_{-1}$, $R_{-2}$.

The FIG. 13 shows a preferred embodiment in which prior to encoding the occlusion data is downscaled (see also FIG. 6). After encoding the resulting data has to be upscaled again. To do so the upfilter coefficients for the best upscaling are calculated e.g. by comparing the downscaled and then upscaled frame to original frames to reducing as much as possible downscaling/upscaling artefacts. These coefficients are incorporated into the data bitstream as metadata. This allows, at the decoder side to do the same.

In this embodiment the references frames used in the occlusion data encoding are centre view frames as well as occlusion data frames.

Figure 14:
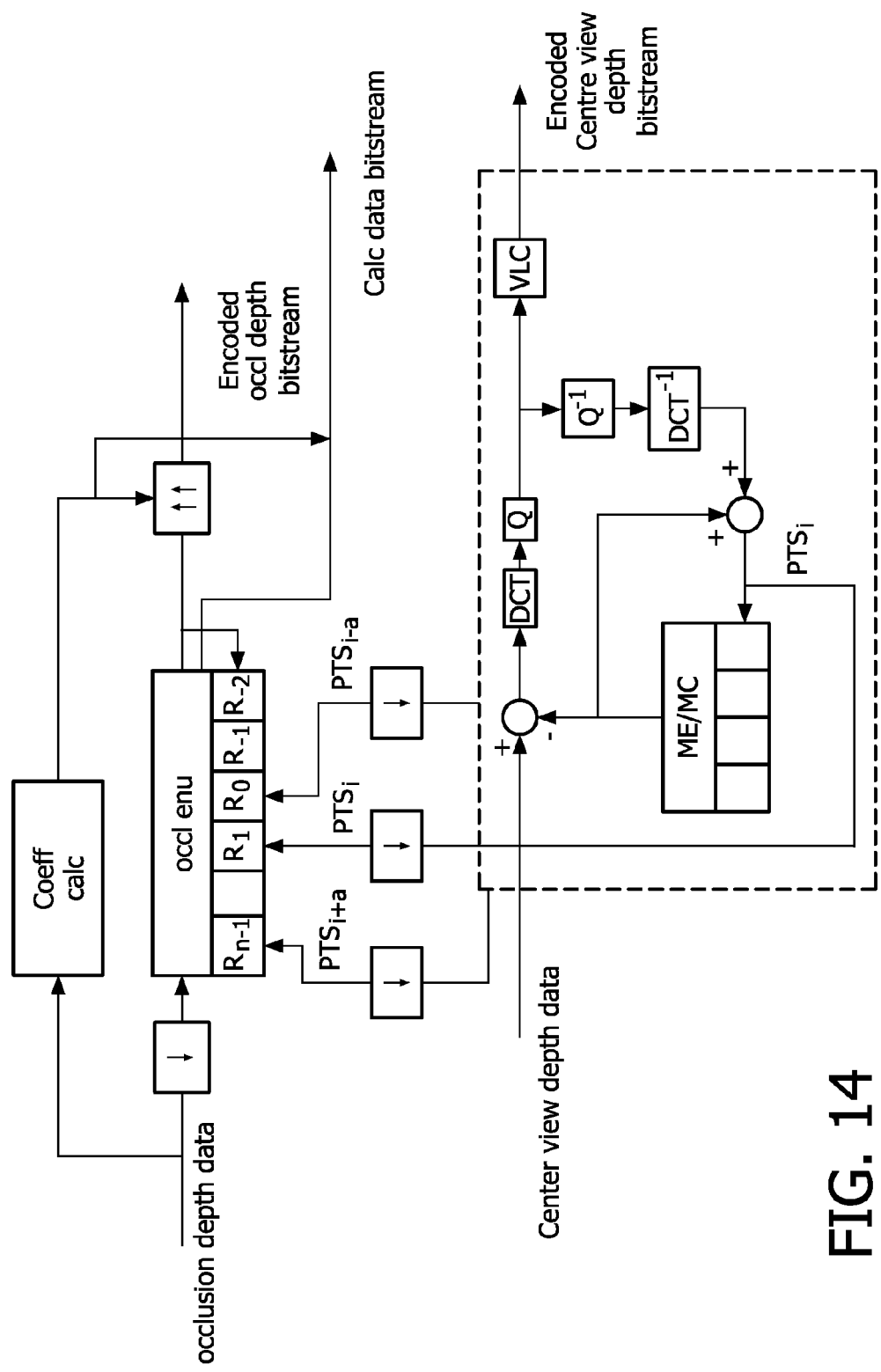
FIG. 14 illustrates a coding method using depth maps for centre view frames as reference frames in coding depth maps for occlusion frames.

The same principle can be applied also to encoding the depth map for the occlusion frame. The depth maps for the centre view data can be used as reference frames in coding the depth map for the occlusion frame. By means of an example a scheme for doing such encoding is shown in FIG. 14. Likewise, the principle of using non-functional data for the occlusion data frame can be used for the depth map for the occlusion frame, see also, FIG. 6.

It is remarked that the principle of using centre view frames as reference for encoding occlusion frames (whether comprising the actual image data or depth data) is applicable independent from the principle of distinguishing functional and non-functional data in the occlusion frames (or depth map for the occlusion frames). However, the above principle is in particular advantageous when combined with the principle of distinguishing non-functional data.

Using one encoder with generalized-B encoding, where the centre view and occlusion data frames are coding as an interleaved image sequence, although providing a useful embodiment has the drawback that it is not backwards compatible with existing 2D encoding schemes.

It is possible to interleave the occlusion and the centre view data. A regular decoder cannot deal with such a stream. All frames would be decoded and displayed which would give a nasty image. Using MVC tools would help to do so.

Figure 15:
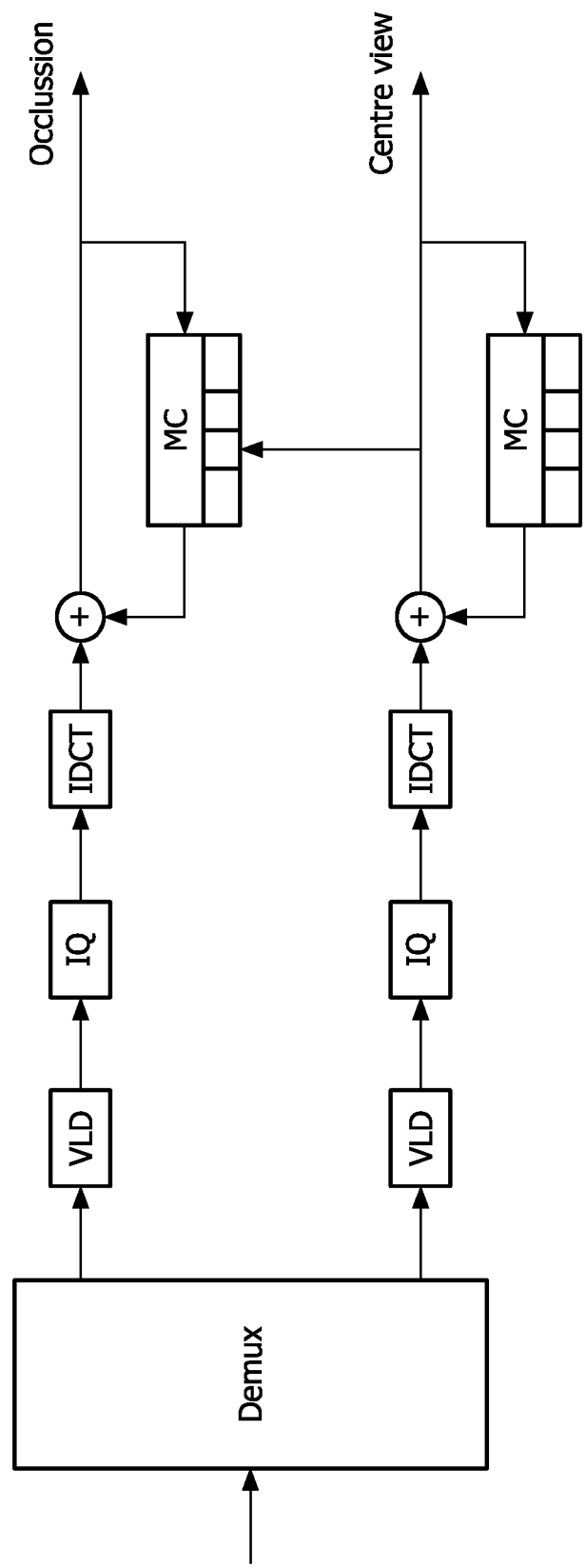
FIG. 15 illustrates a decoding step in which centre view reference frame are used in decoding occlusion frames.

FIG. 15 illustrates a decoding step in which centre view reference frame are used in decoding occlusion frames.

The steps are basically the reverse process from the encoding method shown in FIG. 13. IQ stands for inverse quantization, which in FIG. 13 is denoted $Q^{-1}$, IDCT stands for inverse DCT ($DCT^{-1}$). For the encoding scheme of FIG. 14 for encoding depth data a similar decoding scheme can be used.

The invention relates to a method and system of encoding, as well as to a method and system of decoding, as described above by way of example.

The invention is also embodied in a video signal comprising encoded video signals and control information comprising e.g. functional parameters for use in the method of decoding. The control information may comprise data in accordance with any, or any combination, of the embodiments described above.

The control information enclosed in the video signal according to the present invention may comprise one or more of the following information:

A: general information, i.e. applicable for the whole of the video signal

1. That the method is used for encoding the video signal. This is useful if there is, in the future there is only one standard method used
2. That a particular embodiment of the method is used for encoding the video signal, or parameters within the embodiment such as the threshold value TH.
3. Parameters used in the method, such parameters may be for instance The time stamps used.

Parameters used throughout the encoding of the video signal, such as parameters for filters, upscaling or downscaling algorithms or algorithms to determine which of the predictions is used.

B: particular, dynamic information.

If the video signal is generated dynamically, i.e. certain choices made during encoding are dependent on the video content; the choices made in the encoder may be included into the encoded video signal. For instance, if the encoding method comprises an algorithm to make a decision as to which one of the time stamps is to be used (the for instance the value of a or $\tau 2$) is a choice of including the details of said selection algorithm(s) into the video signal (and thus including general information into the video signal). However, this only works if the decoder comprises said algorithm. If the decoder does not, the particular dynamic information may be sent, i.e. it is specified for a particular part of the video signal (for instance by a flag) that a particular timestamp value is used.

The video signal may comprise general information as well as dynamic information. All of the above types of information, as well as any other type of information relating to the use of the method according to the invention are called within the framework of the application a parameter.

The invention is also embodied in any computer program product for a method or device in accordance with the invention. Under computer program product should be understood any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

In short the invention can be described as follows:

In a method for encoding and an encoder for a 3D video signal, centre view frames, a depth map for centre view frames and an occlusion data frame are encoded. On the basis of the depth map for the centre view frame a distinction is made between functional and non-functional data in an occlusion data frame. This allows a strong reduction in bits needed for the encoded occlusion data frame. In the decoder a combined data stream is made of functional data in the encoded occlusion data frames and the centre view frames. Preferably the centre view frames are used as reference frames in encoding the occlusion data frames.

It should be noted that the above-mentioned embodiments illustrate rather than limit the invention, and that those skilled in the art will be able to design many alternative embodiments without departing from the scope of the appended claims.

Figure 16:
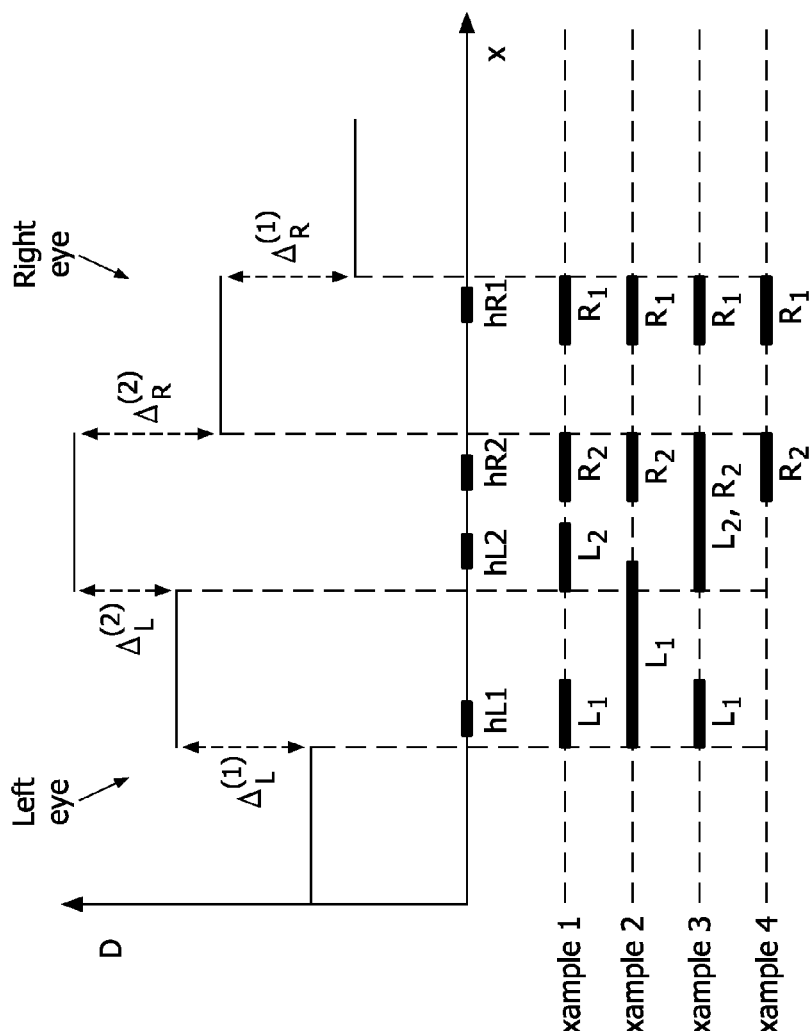
FIG. 16 illustrates a further embodiment of the invention.

For instance, FIG. 16 illustrates yet a further embodiment of the invention.

This FIG. 16 shows a typical disparity profile D as a function of the centre-view pixel position x. The disparity profile basically shows a number of objects in the centre view at various positions separated by steps in depth $\Delta_L^{(1)}$, $\Delta_L^{(2)}$, $\Delta_R^{(1)}$ $\Delta_R^{(2)}$, where the L stands for disparities relevant for left eye views, i.e. a viewing angle from the left, and R for disparities relevant for right eye views. If a new view is rendered using this disparity profile then holes will appear in the new view due to the disparity steps. If a new view is rendered for a left-eye, then the steps $\Delta_L^{(1)}$ and $\Delta_L^{(2)}$ will cause holes (hL1 & hL2) to appear. If a new view is rendered for a right-eye, then the steps $\Delta_R^{(1)}$ and $\Delta_R^{(2)}$ will cause holes (hR1 & hR2) to appear. For a left-eye view, AL exceeding a given threshold indicates that the hole is to be filled with corresponding data from the occlusion frame. However, this is done only if corresponding 'functional data' (areas $L_1$, $L_2$, $R_1$, $R_2$ in examples 1 to 4) are found. These areas of functional data are distinguishable from areas with non-functional data in this example since the luminance values of functional data e.g. above a threshold, whereas luminance data below said threshold (e.g. luminance value of 3) are non-functional data. In case at the corresponding hole positions 'non-functional' data is present then the hole must be filled using data from the centre view texture, for instance, by texture repetition. If two consecutive steps $\Delta_L^{(k)}$ and $\Delta_L^{(k-1)}$ are encountered without 'non-functional' data then the 'functional data' belong to hole due to $\Delta_L^{(k)}$ and they cannot be used to fill the hole due to $\Delta_L^{(k+1)}$ (example 2). The same holds for $\Delta_R^{(k)}$ and $\Delta_R^{(k+1)}$. If 'non-functional' are not encountered, in the occlusion data frame, between two consecutive steps $\Delta_L^{(k)}$ and $\Delta_R^{(m)}$, then the same 'functional data' will be used to fill holes due to both $\Delta_L^{(k)}$ and $\Delta_R^{(m)}$ to create a left-eye and a right-eye view respectively (example 3). 'Functional data' may or may not be present for a given hole (example 4).

If all the '3D' data is available at the encoder (e.g. when the centre view has been constructed by 'blue screen' techniques and all the intermediate layers are still available), the encoder has to make a choice which parts are more important then others, taking also the bitrate of the occlusion frame data into account, before combining this data into an occlusion frame. The examples 1 to 4 show some of the different choices which the encoder could have made. By means of inserting non-functional gaps (occl='0') between the parts (L1, L2, ..., R1, R2, ...) they can be separated from each other and interpreted correctly (so that they appear in the correct hole during rendering) at the decoder side. When due to the choices made by the encoder such hole filling data is not available, because (occl='0') or it is of the wrong type (e.g. for right view rendering never a Lx part can be used for hole filling), the hole should be filled using data from the centre view e.g. by repeating data. As said earlier and indicated by example 3, if non functional data are not encountered between Li and Rj, then such a part can be used for filling the corresponding hole during rendering for both L & R eye directions.

The amount of texture richness in a candidate part for the occlusion data frame can be a criterion for the encoder to decide which parts to prefer above others (example 2, where apparently L1 is more important than L2, which has been omitted).

In such embodiments multiple occlusion parts are combined into one occlusion data frame and indication means (the gaps) are generated for distinguishing the different occlusion parts from each other.

In this embodiment transitions occurrences from functional (occl≠"0") to non-functional (occl="0") i.e. an insertion or not of a gap of the occlusion signal for a least one pixel is used as an indicator for distinguishing the different occlusion parts within the occlusion data frame. As explained above, in embodiments the value for non-functional data may be a reserved value or a value within a reserved range. If a reserved range is used, e.g. 0, 1, 2 and 3, the actual value may be used to convey to the decoder information on the neighboring functional area, for instance whether it is a right or left area, a value of 0 e.g. indicating that a following functional area is a left area, and a value of 1 indicating that a following area is a right area. This information can be set to good use in the decoder, since on characteristic of the different occlusion parts would be known to the decoder.

As stated before with respect to FIG. 6 "non-functional" means that the data is not useable for the pixel value. The data is thus not treated as pixel data. The "non-functional" data may, however, comprise other information of which this is a simple example. In short, if a range of values is used, there is a possibility to convey to the decoder information other than the pixel values via the "non-functional" data. If the non-functional data can be distinguished by other means than their value, for instance by the content of the depth map (see description of FIG. 6), a relatively large amount of information could be stored in the non-functional areas of the occlusion data frames. Of course, this would increase the number of bits needed for the occlusion data frame, but it would also increase the coding efficiency, if such information would be valuable and could not be transmitted efficiently otherwise.

At the decoder side the decoder for decoding an encoded signal receives a video signal wherein multiple occlusion parts are combined into one occlusion data frame and indicators (the inserted gaps and or the actual value within the gaps) are present for distinguishing the different occlusion parts from each other, and the decoder has means for identifying the indicators, i.e. it used the reverse algorithm as used in the encoder to insert indicators.

In the claims, any reference signs placed between parentheses shall not be construed as limiting the claim.

The word "comprising" does not exclude the presence of other elements or steps than those listed in a claim. The invention may be implemented by any combination of features of various different preferred embodiments as described above.

The invention claimed is:

1. Method for encoding 3D video signals wherein a 3D video signal is encoded, the 3D video signal comprising, a centre view video frame, a depth map for the centre view video frame and an occlusion data frame for the center view video frame, the method comprising:
   receiving a first data stream of the 3D video signal, comprising the centre view video frame at a first encoder (CV),
   receiving a second data stream of the 3D video at the encoder, comprising the depth map for the centre view video frame at a second encoder (CV(z)), and
   receiving a third data stream of the 3D video comprising the occlusion data frame for the center view video frame at a third encoder (Occl(z)),
   providing the second video stream comprising the depth map for the centre view video frame to a controller, the controller regulating a switch to distinguish relevant occlusion data from non-relevant occlusion data under control of data in the depth map for the centre view video frame,
   wherein in the control of data in the depth map, a depth discontinuity threshold is applied, wherein a depth discontinuity in the depth map being smaller than a threshold value (TH) is a determining factor for distinguishing relevant occlusion data from non-relevant occlusion data, and
   wherein the threshold value (TH) is dynamically calculated from the data in the depth map.

2. Method for encoding as claimed in claim 1, wherein the occlusion data frame is encoded after the depth map is encoded.

3. Method for encoding as claimed in claim 1, where also an occlusion depth map is encoded.

4. Method for encoding as claimed in claim 3, where occlusion depth frame data is used for generation of an indication means for distinguishing relevant occlusion data in the occlusion data frame from nonfunctional data.

5. Method for encoding as claimed in claim 1, wherein under control of data in the depth map a fixed value or a value within a fixed range is generated in the occlusion data frame as an indication means to distinguish non-functional data (occl="0").

6. Method for encoding as claimed in claim 5 wherein the fixed value or value within a fixed range is reserved for non-functional data, and any relevant occlusion data of the fixed value or within the fixed value range is replaced with a value other than the reserved value or outside the reserved range.

7. Method for encoding as claimed in claim 5, wherein the threshold value (TH) and/or the fixed value or fixed range is incorporated in the encoded video signal.

8. Method for encoding as claimed in claim 7 wherein the threshold value (TH) and/or the fixed value or fixed range is incorporated as metadata in the video signal.

9. Method for encoding as claimed in claim 1 wherein multiple occlusion parts are combined into one occlusion data frame and indication means are generated for distinguishing the different occlusion parts from each other.

10. Method for encoding as claimed in claim 9 wherein transitions occurrences from relevant occlusion data (occl≠"0") to non-functional (occl="0") and/or from non-functional (occl="0") to relevant occlusion data (occl≠"0") in the occlusion signal for a least one pixel is used as an indicator for distinguishing the different occlusion parts within the occlusion data frame.

11. Method for encoding as claimed in claim 1, wherein a further determining factor in the control is the maximum viewing angle.

12. Method for encoding as claimed in claim 1, wherein a further determining factor in the control is formed by the bit rate of the coded occlusion data frame.

13. Method as claimed in claim 1 wherein center view data frames are used as reference frames in encoding of occlusion data frames.

14. Method as claimed in claim 13 wherein time shifted centre view data are used in encoding of occlusion data frames and the time shifts are calculated from the image data.

15. Method as claimed in claim 14, wherein the calculated time shifts are incorporated into the video signal.

16. Method as claimed in claim 15, wherein the calculated time shifts are incorporated as metadata into the video signal.

17. Encoder for encoding a 3-D video signal, the encoded 3D video signal comprising a centre view video frame, a depth map for the centre view video frame and an occlusion data frame for the center view video frame,
   wherein the encoder comprises inputs for to be encoded centre view data frames, depth maps for a centre view data frame, and occlusion data frames, and
   wherein the encoder further comprises a controller operative to regulate a switch to distinguish relevant occlusion data from non-relevant occlusion data under control of data in the depth map for the centre view video frame,
   wherein in the control of data in the depth map, a depth discontinuity threshold is applied, wherein a depth discontinuity in the depth map being smaller than a threshold value (TH) is a determining factor for distinguishing relevant occlusion data from non-relevant occlusion data, and
   wherein the threshold value (TH) is dynamically calculated from the data in the depth map.

18. Encoder as claimed in claim 17, wherein the encoder comprises an aligner and the alignment of the relevant occlusion and nonfunctional data is blockgrid aligned.

19. Encoder as claimed in claim 18, wherein the aligner is arranged for aligning the blockgrid at 4×4, 8×8, 16×16 and/or any other integer combination.

20. Encoder as claimed in claim 17, wherein the encoder comprises an encoder (Encoder CV(z)) for encoding the depth map for the centre view frames and an internal decoder (decoder CV(Z)) for decoding the encoding depth maps, wherein the depth maps decoded by the internal decoder are used in the controller.

21. Encoder as claimed in claim 17, wherein the encoder comprises a calculator for calculation a threshold value (TH) for the depth discontinuity in the depth map, wherein the control of the switch is dependent on a measured depth discontinuity versus threshold value comparison.

22. Encoder as claimed in claim 21 wherein the encoder comprises an output for incorporating the calculated threshold (TH) into the encoded data stream.

23. Encoder as claimed in claim 17 wherein the encoder comprises an encoder for encoding centre view frames and a decoder for decoding encoded centre view frames, an encoder for encoding the occlusion data frames and an input at the encoder for encoding the occlusion data frames for inserting decoded centre view frames as reference frames.

24. Encoder as claimed in claim 21, wherein shift parameters (τ2, a) are calculated and incorporated into the video signal.

25. Method for decoding an encoded 3D video signal, the 3D video signal comprising:
an encoded centre view video frame,
a depth map for the centre view video frame and
an occlusion data frame for the center view video frame,
wherein the encoded video signal comprises indications to distinguish non-relevant occlusion data from relevant occlusion data based on the application of a depth discontinuity threshold applied at the encoder, wherein a depth discontinuity in the depth map being smaller than a threshold value (TH) is a determining factor for distinguishing relevant occlusion data from non-relevant occlusion data, and
wherein the threshold value (TH) is dynamically calculated from the data in the depth map, and
wherein in the decoding a combined data stream is produced, comprising relevant occlusion data and centre view data.

26. Method for decoding an encoded video signal as claimed in claim 25 wherein in the decoding of the occlusion data frames centre view data frames are used as reference frames.

27. Method for decoding an encoded video signal as claimed in claim 25 wherein the combined signal is warped after generation.

28. Method for decoding an encoded signal as claimed in claim 25, wherein warping is performed prior to generation of the combined signal (78).

29. Method for decoding an encoded signal as claimed in claim 25 wherein in the decoding a combined depth data stream is produced, comprising relevant functional depth occlusion data and depth centre view data.

30. Decoder for decoding an encoded 3D video signal, the 3D video signal comprising:
an encoded centre view video frame,
a depth map for the centre view video frame and,
an occlusion data frame for the center view video frame,
the encoded video signal comprising indications to distinguish non-relevant occlusion data from relevant occlusion data based on the application of a depth discontinuity threshold applied at the encoder, wherein a depth discontinuity in the depth map being smaller than a threshold value (TH) is a determining factor for distinguishing relevant occlusion data from non-relevant occlusion data, and
wherein the threshold value (TH) is dynamically calculated from the data in the depth map, and
wherein the decoder comprises:
a combiner for producing a combined data stream, said combined signal comprising relevant occlusion data and centre view data.

31. Decoder for decoding an encoded video signal as claimed in claim 30 wherein the decoder for the occlusion data frames is arranged for using in the decoding of the occlusion data frames centre view data frames used as reference frames.

32. Decoder for decoding an encoded video signal as claimed in 30 wherein the decoder comprises a warper (warp 1) for warping the combined signal.

33. Decoder for decoding an encoded signal as claimed in claim 30, wherein the decoder comprises a warper (warp A) for performing warping prior to generation of the combined signal.

34. Decoder for decoding an encoded signal as claimed in claim 30 wherein the decoder comprises a combiner for producing a combined depth data stream, comprising relevant depth occlusion data and depth centre view data.

35. Decoder for decoding an encoded signal as claimed in claim 30 wherein the encoded signal comprises multiple occlusion parts combined into one occlusion data frame and the encoded signal comprises indicators for distinguishing the different occlusion parts from each other, the decoder having means for identifying the indicators and using the indicators identifying the various occlusion parts.

36. Decoder for decoding an encoded signal as claimed in claim 35 wherein the indicators are formed by transitions occurrences from relevant (occl≠"0") to non-functional (occl="0") and/or from non-functional (occl="0") to relevant (occl≠"0") in the occlusion signal.

37. A non-transitory 3D video signal comprising:
an encoded centre view video frame,
a depth map for the centre view video frame and
an occlusion data frame for the center view video frame,
wherein the 3D video signal comprises an indication means for distinguishing non-functional occlusion data from relevant occlusion data based on the application of a depth discontinuity threshold applied at the encoder, wherein a depth discontinuity in the depth map being smaller than a threshold value (TH) is a determining factor for distinguishing relevant occlusion data from non-relevant occlusion data, and
wherein the threshold value (TH) is dynamically calculated from the data in the depth map.

38. 3D video signal as claimed in claim 37 wherein the nonfunctional data have a fixed value or a value within a fixed range and the functional values have a value other than the fixed value or a value outside the fixed range, said value acting as indication means.

39. 3D video signal as claimed in claim 37 wherein the indication means comprises a threshold value for the depth discontinuity.

40. 3D video signal as claimed in claim 37 wherein the 3D video signal comprises an encoded depth map for the occlusion data frame, the encoded depth map comprising the indication means for distinguishing non-functional occlusion data from functional occlusion data.

41. 3D video signal as claimed in claim 37 wherein the video signal comprises, as metadata, a range of values or a value for the occlusion data, said value or range indicating whether occlusion data is functional or nonfunctional.

42. 3D video signal as claimed in claim 37 wherein the video signal comprises control information for controlling the manner in which, during decoding centre view frames are used as reference frames for decoding occlusion data frames.

43. A non-transitory computer-readable medium, in which a computer program comprising program code means, when being executed by a processor is adapted to carry out or control the method according to claim 1.

44. A non-transitory computer-readable medium, in which a computer program comprising program code means, when being executed by a processor is adapted to carry out or control the method for decoding as claimed in claim 25.

45. A non-transitory computer-readable medium, in which a computer program product comprising program code means, when being executed by a processor is adapted to carry out or control an encoding method as claimed in claim 1.

46. A non-transitory computer-readable medium, in which a computer program product comprising program code means, when executed by a processor is adapted to carry out or control a decoding method as claimed in claim 25.

* * * * *